(12) United States Patent
Lord

(10) Patent No.: US 11,477,156 B2
(45) Date of Patent: Oct. 18, 2022

(54) WATERMARKING AND SIGNAL RECOGNITION FOR MANAGING AND SHARING CAPTURED CONTENT, METADATA DISCOVERY AND RELATED ARRANGEMENTS

(71) Applicant: Digimarc Corporation, Beaverton, OR (US)

(72) Inventor: John D. Lord, West Linn, OR (US)

(73) Assignee: Digimarc Corporation, Beaverton, OR (US)

(*) Notice: Subject to any disclaimer, the term of this patent is extended or adjusted under 35 U.S.C. 154(b) by 17 days.

(21) Appl. No.: 17/007,907

(22) Filed: Aug. 31, 2020

(65) Prior Publication Data

US 2021/0058360 A1 Feb. 25, 2021

Related U.S. Application Data

(63) Continuation of application No. 15/985,421, filed on May 21, 2018, now Pat. No. 10,764,230, which is a
(Continued)

(51) Int. Cl.
*G06K 9/00* (2022.01)
*H04L 51/52* (2022.01)
(Continued)

(52) U.S. Cl.
CPC ............ *H04L 51/52* (2022.05); *G06T 1/0021* (2013.01); *G10L 19/018* (2013.01); *H04L 51/10* (2013.01);
(Continued)

(58) Field of Classification Search
CPC ......... H04N 21/8358; H04N 21/23892; H04N 21/44008; H04N 21/44204; H04N 21/8547; H04N 19/467; H04N 21/23418; H04N 21/8352; H04N 21/4722; H04N 1/00034; H04N 1/0087; H04N 1/0088; H04N 21/20; H04N 21/21; H04N 21/2747; G06F 21/16; G06F 2221/0733; G06F 16/00; G06F 16/245; G06F 16/2455; G06F 16/248; G06F 16/683; G06F 16/903; G06F 16/90335; G06F 2221/2151; G06T 1/0021; G06T 1/0028; G06T 1/005; G06T 2201/0051; G06T 2201/0065; G06T 2201/0061;
(Continued)

(56) References Cited

U.S. PATENT DOCUMENTS 6,505,160 B1 1/2003 Levy
6,681,029 B1* 1/2004 Rhoads ................ G07F 7/1016
704/E19.009
(Continued)

OTHER PUBLICATIONS

International Search Report and Written Opinion dated May 5, 2014 in PCT/US2014/036845.
(Continued)

*Primary Examiner* — Shervin K Nakhjavan
(74) *Attorney, Agent, or Firm* — Digimarc Corporation

(57) ABSTRACT

Content is identified using watermarking and/or other content recognition combined with contextual metadata, which facilitates identification and correlation with other content and metadata when it is posted to a network.

20 Claims, 13 Drawing Sheets

Related U.S. Application Data continuation of application No. 15/276,505, filed on Sep. 26, 2016, now Pat. No. 9,979,691, which is a continuation of application No. 14/270,163, filed on May 5, 2014, now Pat. No. 9,454,789.

(60) Provisional application No. 61/819,506, filed on May 3, 2013.

(51) Int. Cl.

| | | |
|---|---|---|
| *H04N 21/422* | (2011.01) | |
| *H04N 21/218* | (2011.01) | |
| *H04N 21/2187* | (2011.01) | |
| *H04N 21/233* | (2011.01) | |
| *H04N 21/234* | (2011.01) | |
| *H04N 21/2665* | (2011.01) | |
| *H04N 21/2668* | (2011.01) | |
| *H04N 21/2743* | (2011.01) | |
| *H04N 21/4223* | (2011.01) | |
| *G10L 19/018* | (2013.01) | |
| *H04N 21/8358* | (2011.01) | |
| *G06T 1/00* | (2006.01) | |
| *H04N 21/462* | (2011.01) | |
| *H04N 21/658* | (2011.01) | |
| *H04L 51/10* | (2022.01) | |
| *H04N 21/4788* | (2011.01) | |

(52) U.S. Cl.
CPC ... *H04N 21/2187* (2013.01); *H04N 21/21805* (2013.01); *H04N 21/233* (2013.01); *H04N 21/23418* (2013.01); *H04N 21/2665* (2013.01); *H04N 21/2668* (2013.01); *H04N 21/2743* (2013.01); *H04N 21/4223* (2013.01); *H04N 21/42203* (2013.01); *H04N 21/4622* (2013.01); *H04N 21/6581* (2013.01); *H04N 21/8358* (2013.01); *G06T 2201/005* (2013.01); *H04N 21/4788* (2013.01)

(58) Field of Classification Search
CPC ........... G06T 1/0085; G06T 2201/0052; G06T 2201/0083; G06T 2201/005; H04H 2201/50; H04H 60/45; H04L 2209/608
See application file for complete search history.

(56) References Cited

U.S. PATENT DOCUMENTS

| | | | | |
|---|---|---|---|---|
| 7,095,871 | B2* | 8/2006 | Jones | G11B 20/00086 |
| | | | | 707/E17.112 |
| 7,372,976 | B2 | 5/2008 | Rhoads | |
| 7,450,734 | B2 | 11/2008 | Rodriguez | |
| 7,478,240 | B1* | 1/2009 | August | H04N 21/8133 |
| | | | | 713/176 |
| 7,689,532 | B1 | 3/2010 | Levy | |
| 7,966,494 | B2 | 6/2011 | Rhoads | |
| 8,121,342 | B2 | 2/2012 | Davis | |
| 8,645,838 | B2 | 2/2014 | Ramos | |
| 8,842,875 | B2 | 9/2014 | Rodriguez | |
| 8,924,412 | B2 | 12/2014 | Rhoads | |
| 9,706,235 | B2* | 7/2017 | Petrovic | H04N 21/44008 |
| 2002/0124024 | A1* | 9/2002 | Patterson | G01C 11/00 |
| | | | | 715/202 |
| 2002/0126842 | A1 | 9/2002 | Hollar | |
| 2003/0059086 | A1* | 3/2003 | Hayashi | G06T 1/005 |
| | | | | 382/232 |
| 2003/0112974 | A1* | 6/2003 | Levy | H04N 21/64707 |
| | | | | 713/176 |
| 2003/0123701 | A1* | 7/2003 | Dorrell | H04N 1/32283 |
| | | | | 382/232 |
| 2003/0130954 | A1* | 7/2003 | Carr | G06Q 30/02 |
| | | | | 705/60 |
| 2003/0185417 | A1* | 10/2003 | Alattar | G06T 1/0064 |
| | | | | 382/100 |
| 2003/0223099 | A1* | 12/2003 | Fan | H04N 1/32309 |
| | | | | 358/537 |
| 2004/0022412 | A1* | 2/2004 | Iwamura | H04N 19/467 |
| | | | | 382/232 |
| 2004/0117629 | A1* | 6/2004 | Koto | G06T 1/0028 |
| | | | | 713/176 |
| 2004/0181671 | A1* | 9/2004 | Brundage | B42D 25/00 |
| | | | | 713/176 |
| 2005/0063027 | A1* | 3/2005 | Durst, Jr. | G07D 7/0032 |
| | | | | 359/558 |
| 2005/0271246 | A1* | 12/2005 | Sharma | G06Q 20/3823 |
| | | | | 713/168 |
| 2006/0041591 | A1* | 2/2006 | Rhoads | G06F 16/48 |
| 2006/0159303 | A1* | 7/2006 | Davis | G06Q 20/40145 |
| | | | | 382/100 |
| 2006/0212704 | A1* | 9/2006 | Kirovski | H04L 9/32 |
| | | | | 704/E19.009 |
| 2006/0239502 | A1* | 10/2006 | Petrovic | H04N 1/32245 |
| | | | | 380/54 |
| 2007/0055689 | A1* | 3/2007 | Rhoads | G06F 16/95 |
| | | | | 707/999.102 |
| 2007/0091376 | A1* | 4/2007 | Calhoon | G06T 1/0021 |
| | | | | 382/100 |
| 2008/0034064 | A1 | 2/2008 | Choi | |
| 2008/0049971 | A1* | 2/2008 | Ramos | G06F 40/143 |
| | | | | 382/100 |
| 2008/0133555 | A1* | 6/2008 | Rhoads | H04N 1/00962 |
| | | | | 707/E17.112 |
| 2008/0307227 | A1* | 12/2008 | Huang | G06T 1/005 |
| | | | | 713/176 |
| 2009/0012944 | A1* | 1/2009 | Rodriguez | G06F 16/951 |
| 2009/0158318 | A1* | 6/2009 | Levy | H04N 21/8358 |
| | | | | 386/249 |
| 2010/0046842 | A1 | 2/2010 | Conwell | |
| 2010/0114979 | A1 | 5/2010 | Petersen | |
| 2010/0161654 | A1* | 6/2010 | Levy | G06F 21/10 |
| | | | | 707/769 |
| 2010/0205628 | A1* | 8/2010 | Davis | H04N 21/4126 |
| | | | | 455/414.1 |
| 2010/0280641 | A1 | 11/2010 | Harkness | |
| 2011/0161076 | A1* | 6/2011 | Davis | H04M 1/72448 |
| | | | | 704/E15.001 |
| 2011/0283310 | A1* | 11/2011 | Davis | H04N 21/472 |
| | | | | 455/414.1 |
| 2011/0289098 | A1* | 11/2011 | Oztaskent | H04N 21/84 |
| | | | | 707/769 |
| 2012/0027256 | A1 | 2/2012 | Kiyohara | |
| 2012/0214515 | A1 | 8/2012 | Davis | |
| 2012/0275642 | A1* | 11/2012 | Aller | G06T 7/73 |
| | | | | 382/100 |
| 2013/0007790 | A1* | 1/2013 | McMillan | G06T 1/0092 |
| | | | | 725/14 |
| 2013/0013683 | A1 | 1/2013 | Elliott | |
| 2013/0064419 | A1 | 3/2013 | Sharma | |
| 2013/0091582 | A1* | 4/2013 | Chen | H04L 67/306 |
| | | | | 726/26 |
| 2013/0151855 | A1* | 6/2013 | Petrovic | H04N 21/4627 |
| | | | | 713/176 |
| 2013/0151856 | A1* | 6/2013 | Petrovic | H04N 1/00846 |
| | | | | 713/176 |
| 2013/0166639 | A1* | 6/2013 | Shaffer | G06Q 50/01 |
| | | | | 709/204 |
| 2013/0195273 | A1 | 8/2013 | Lord | |
| 2014/0067950 | A1* | 3/2014 | Winograd | H04L 67/306 |
| | | | | 709/204 |
| 2014/0106710 | A1 | 4/2014 | Rodriguez | |
| 2014/0108020 | A1 | 4/2014 | Sharma | |
| 2014/0142958 | A1 | 5/2014 | Sharma | |
| 2014/0219495 | A1* | 8/2014 | Hua | H04L 63/08 |
| | | | | 382/100 |
| 2014/0279296 | A1* | 9/2014 | Petrovic | H04N 21/8358 |
| | | | | 705/28 |
| 2016/0225116 | A1* | 8/2016 | Tehranchi | H04N 1/32101 |
| 2017/0018278 | A1 | 1/2017 | Srinivasan | |

(56) References Cited

U.S. PATENT DOCUMENTS

OTHER PUBLICATIONS

Anonymous, 'Identifying and Managing Digital Media: A Technology Comparison of Digital Watermarking and Fingerprinting', (Dec. 31, 2010), URL: https://www.digimarc.com/docs/default-source/technology-resources/white-papers/dmrc_wp_dwmvsfingerprinting.pdf?sfvrsn=4, (Sep. 29, 2016), XP055306714.
Ryuki Tachibana, 'Audio watermarking for live performance', Optomechatronic Micro/Nano Devices and Components III : Oct. 8-10, 2007, Lausanne, Switzerland; [Proceedings of SPIE , ISSN 0277-786X], SPIE, Bellingham, Wash, (Jun. 1, 2003), vol. 5020, doi:10.1117/12.476832, ISBN 978-1-62841-730-2, pp. 32-43, XP002442545.
European Search Report dated Oct. 11, 2016 in EP14791291.9.
Examination Report dated Sep. 13, 2017 in European Application No. 14791291.9.
European Patent Office Communication pursuant to Article 94(3) EPC for Application No. 14791291.9, dated Apr. 3, 2019, 9 pages.
Sierra Modro et al: "Digital Watermarking Opportunities Enabled by Mobile Media Proliferationy", Visual Communications and Image Processing; Jan. 20, 2004-Jan. 20, 2004; San Jose, vol. 7254, Jan. 18, 2009 (Jan. 18, 2009), pp. 1-10, XP007922143, DOI: 10.1117/12.813762, ISBN: 978-1-62841-730-2.
Ching-Wei Chen et al: "Content identification in consumer applications", Multimedia and Expo, 2009. ICME 2009. IEEE International Conference on, IEEE, Piscataway, NJ, USA, Jun. 28, 2009 (Jun. 28, 2009), pp. 1536-1539, XP031511053, DOI: 10.1109/1 CME.2009.5202797, ISBN: 978-1-4244-4290-4.

\* cited by examiner

WATERMARKING AND SIGNAL RECOGNITION FOR MANAGING AND SHARING CAPTURED CONTENT, METADATA DISCOVERY AND RELATED ARRANGEMENTS

CROSS-REFERENCE TO RELATED APPLICATIONS

This application is a continuation of U.S. application Ser. No. 15/985,421, filed May 21, 2018 (now U.S. Pat. No. 10,764,230), which is a continuation of U.S. application Ser. No. 15/276,505, filed Sep. 26, 2016 (now U.S. Pat. No. 9,979,691) which is a continuation of U.S. application Ser. No. 14/270,163, filed May 5, 2014 (now U.S. Pat. No. 9,454,789), which claims the benefit of U.S. Provisional Application No. 61/819,506, filed May 3, 2013, which is incorporated hereby by reference in its entirety.

TECHNICAL FIELD

The invention relates to digital signal processing for signal recognition or identification, encoding/decoding auxiliary data channels in audio or image/video, managing and sharing content on networks, and discovering and attributing metadata associated with the content.

BACKGROUND AND SUMMARY

The posting and sharing of image and video content is a major trend in social media, and it is growing rapidly along with the expanding audio and video processing capability offered by mobile devices and cloud services. The proliferation of smart phones, tablets and other mobile, networked devices with high quality cameras and audio capture has given rise to new forms of social media, built around the sharing of pictures and video. This trend will undoubtedly grow, fueled by users' insatiable desire to share their experiences and creativity immediately with others, expanding their social influence and having the experience of others amplify their own.

Mobile device users are particularly intent on sharing experiences when they are enjoying themselves with others at events, such as concerts, shows, parties, etc. For example, it is typical to witness several attendees of a concert capturing video of the experience on their smart phones and immediately sharing it that video with friends. Because these participants in these types of events naturally share a community of interest with each other, they tend to want to further connect with others at the event through social media. Merely sharing one's experience with existing friends is insufficient, as the desire is to enhance enjoyment by connecting with new friends and learning others' reactions and input to an event that they are experiencing together (e.g., in real-time). Others have similar interests and can share perspectives on something of common interest.

Yet, there is a lack of an efficient means to manage and build that community of interest around such experiences. Attendees can share the experience with other friends connected via their social network or social graph. But there is little opportunity, without further searching on the part of the user, to see what perspective and content others captured and provided for the event.

One inventive embodiment is a method that includes receiving an item of content captured by an electronic device associated with a user; obtaining information extracted from the received item of captured content; and, by reference to the obtained information, correlating the received item of captured content with at least one of: at least one other item of captured content, at least one item of metadata associated with the at least one other item of captured content, and at least one item of metadata associated with the information extracted from the received item of captured content.

Another inventive embodiment is a method that includes receiving an item of content captured by an electronic device associated with a user; obtaining information extracted from the received item of captured content; and, by reference to the obtained information, aggregating data associated with at least one of: the obtained information; and at least one item of metadata associated with the obtained information.

Yet another inventive embodiment is a method that includes receiving, at a network system configured to render at least one network service to posted items of content, an item of posted content captured by an electronic device associated with a user; obtaining information extracted from the received item of posted content; by reference to the obtained information, making a determination as to at least one service to be rendered in regards to the received item of posted content; and rendering the at least one determined service to the received item of posted content based on the determination.

A variety of social media and network services may be made available to users that give them access to the uploaded content and aggregated metadata for an event. This enables users to get an enhanced presentation of the event as experienced by others at the event and augmented by additional metadata obtained from the network.

In certain configurations, content fingerprints and context information provided by the user's mobile device may also be used to correlate uploads relating to an event from several users. The various trade-offs and complementary features afforded by using watermarking and/or fingerprinting are described further below.

Various aspect of the inventions disclosed in this document are recited in claim sets at the end of this document. Further inventions, and various configurations for combining them, are described in more detail in the description that follows. As such, further inventive features will become apparent with reference to the following detailed description and accompanying drawings.

BRIEF DESCRIPTION OF THE DRAWINGS

FIG. 5 is a diagram illustrating a combined hardware and software system, with a watermark embedder plug in.

DETAILED DESCRIPTION

Overview

Figure 1:
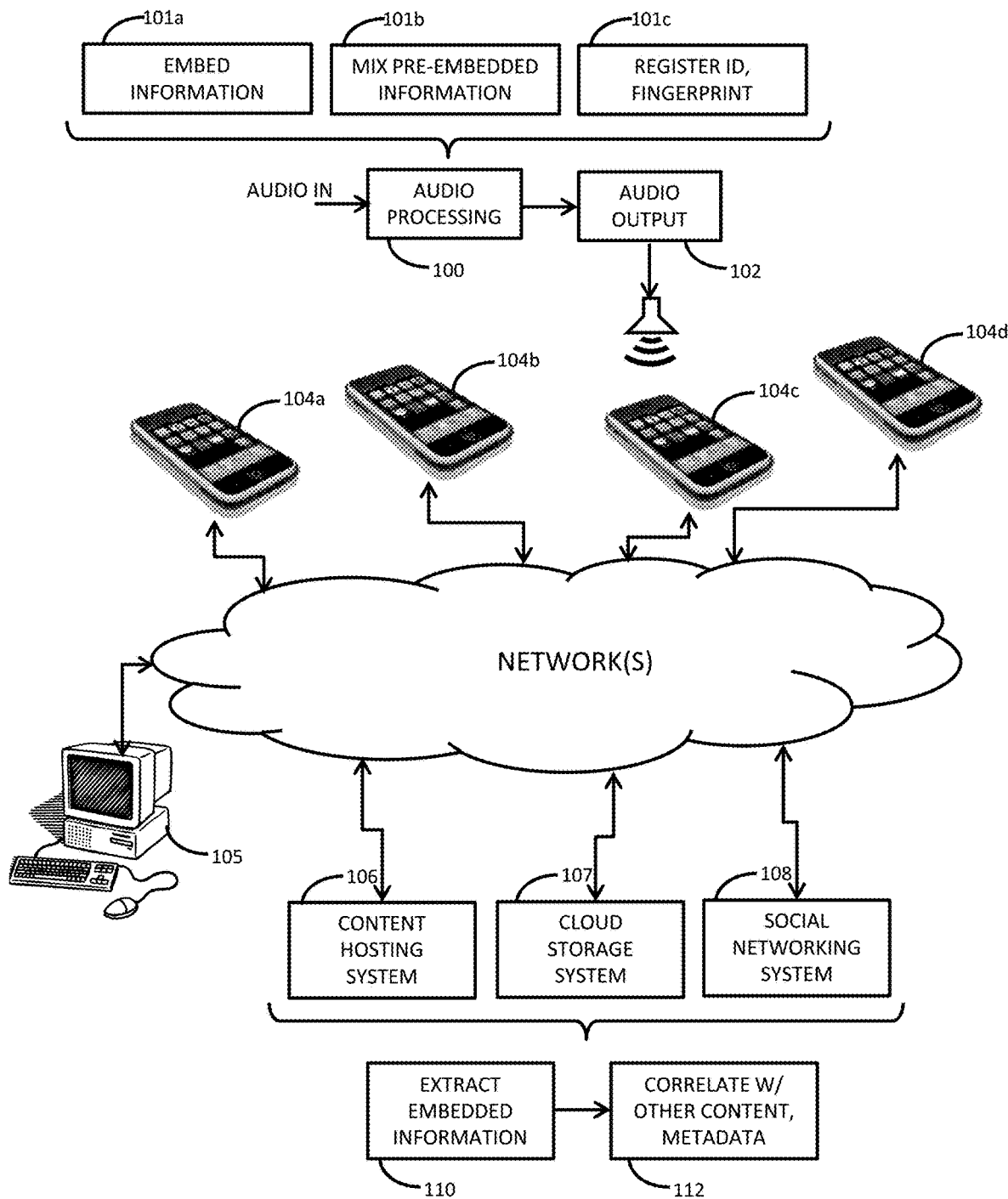
FIG. 1 is a diagram illustrating a system for managing and sharing of content by users, along with processing flow diagrams illustrating content processing that facilitates the correlation of content and metadata associated with events.

FIG. 1 is a diagram illustrating a system for managing and sharing of content by users. At a particular venue or social event, audio or audiovisual (AV) content is produced in an audio processing system 100 and output to audience members via an audio output system 102. The audio processing system 100 may include an audio mixer, an audio CODEC, an audio digital signal processor (DSP), a sequencer, a digital audio workstation (DAW), or the like or any combination thereof. The audio output system 102 may include one or more audio amplifiers, one or more loudspeakers (e.g., studio monitors, stage monitors, loudspeakers as may be incorporated within—or used in conjunction with—electronic devices such as mobile phones, smartphones, tablet computers, laptop computers, desktop computers, personal media players, speaker phones, etc.).

The output content may include live audio captured and mixed in the audio processing system 100, playback of one or more pre-recorded content streams, or a mixture of live and pre-recorded audio content streams. The output content may also include the production of computer-synthesized speech (e.g., corresponding to one or more textual inputs such as research articles, news articles, commentaries, reviews, press-releases, transcripts, messages, alerts, etc.), synthesized music or sound-effect (e.g., via a sound synthesizer), etc., which may be performed with or without human intervention.

It will be appreciated that the produced content need not necessarily be output via the audio output system 102. For example the produced content can be recorded or otherwise stored in some data structure conveyed by a tangible media (e.g., incorporated within the audio processing system 100 or otherwise coupled to the audio processing system 100 via one or more wired or wireless connections) that may include semiconductor memory (e.g., a volatile memory SRAM, DRAM, or the like or any combination thereof, a non-volatile memory such as PROM, EPROM, EEPROM, NVRAM (also known as "flash memory", etc.), magnetic memory (e.g., a floppy disk, hard-disk drive, magnetic tape, etc.), optical memory (e.g., CD-ROM, CD-R, CD-RW, DVD, Holographic Versatile Disk (HVD), Layer-Selection-Type Recordable Optical Disk (LS-R), etc.), or the like or any combination thereof. In other examples, content produced by the audio processing system 100 can be broadcasted (e.g., via one or more suitable over-the-air RF communication channels associated with broadcast radio, via one or more suitable over-the-air or coaxial cable RF communication channels or fiber-optic communication channels associated with television communications, etc.), streamed (e.g., over the Internet, via one or more content delivery networks), etc.

For digital watermarking based embodiments, data can be embedded in audio content that is output at the event via a real-time or near real-time digital watermark embedding process (see embedding process 101*a*), can be pre-embedded in audio content that is output at the event, either mixed with other audio or by itself (see mixing process 101*b*), or a combination thereof. The embedded data serves as an auxiliary data channel or signal within the audio. As will become evident from the discussion below, this auxiliary data can carry various types of information (e.g., identifying information corresponding to the embedded watermark, synchronization information, and other information, as will be discussed in greater detail below), which can be used for many applications. For a specification of digital watermark embedding for audio, see U.S. Patent App. Pub. No. 2014/0108020 (Now U.S. Pat. No. 9,401,153) and our co-pending application Ser. No. 14/054,492, filed Oct. 15, 2013, entitled MULTI-MODE AUDIO RECOGNITION AND AUXILIARY DATA ENCODING AND DECODING (Now U.S. Pat. No. 9,305,559), each of which are hereby incorporated by reference. Some forms of audio watermarking and audio speaker configurations provide the additional benefit of enabling detection systems to ascertain location of the capture device. This is useful in managing and processing uploaded content from event based on location of the capture device that captured the uploaded content. See, in particular, U.S. Patent App. Pub. No. 2012/0214515, which is also hereby incorporated by reference.

For fingerprinting embodiments, fingerprints of the content are registered (e.g., as identifying information) in a fingerprint database, see 101*c*. In the following description, various trade-offs between watermarking and fingerprinting embodiments are listed. We intend to cover watermarking, fingerprinting and embodiments that use both. For background, see U.S. Patent Publication 20100322469 (by Sharma, entitled Combined Watermarking and Fingerprinting), which is hereby incorporated by reference.

Audience members capture audio content and imagery (e.g., one or more still images or video) of the event via their mobile devices (e.g., 104*a-d*), which may be provided as a smartphone (as illustrated) or other suitably-equipped electronic device such as a mobile phone, tablet or laptop computer, desktop computer, digital voice recorder, digital camera, wearable electronic device (e.g., of the likes that may be worn on, or otherwise mounted to, the user's wrist—such as Samsung's Galaxy Gear, the user's arm—such as Panasonic's HX-A500, the user's head—such as Panasonic's HX-A500, Google's Glass, etc., the user's ear—such as Looxcie's LX2 Wearable Video Cam, etc.), or the like or any combination thereof. This capture can be done using audio or optical capture capability of a mobile device as provided by its mobile operating system (e.g., Android, iOS, Windows Phone, etc.), a mobile application program, etc.

Generally, captured content contains information that is related to the embedded auxiliary data (e.g., the identifying information). However, it will be appreciated that, sometimes, the captured content may contain information that is unrelated to the embedded data. For example, a user might record a video of their cat chasing a toy mouse, while in the background there is sound (e.g., embedded with a watermark conveying identifying information) from a television program (e.g., a football game). The video thus contains the identifying information embedded into the audio portion of the television program, but also contains other information (e.g., imagery of the user's cat) that is unrelated to the identifying information. Such other information could indicate that the user might not be watching the television program. Such sets of information may be valuable in itself, e.g., for data-mining. For example, captured content such as the aforementioned video clip may be analyzed to yield information indicating that the user was watching the football game, and thus has interest in that topic, even though they were more focused on the cat's antics at that instant. It may be further deduced the game may not have been particularly captivating, or that TV ads were on, etc., which bear information to those inclined to look for it.

Content captured by one or more of the mobile devices can then be transferred or uploaded (e.g., through one or more wired or wireless networks such as a WiFi network, a Bluetooth network, a Bluetooth Low Energy network, a cellular network, an Ethernet network, an intranet, an extranet, the Internet, or the like or any combination thereof) to one or more network systems such as a content hosting system 106 (e.g., YouTube, Vimeo, DailyMotion, SoundCloud, Instagram, Vine, etc.), a cloud storage system 107 (e.g., of the likes provided by Dropbox, Apple's iCloud, Google Drive, Microsoft's One Drive, Amazon Cloud Drive, etc.), a social networking system 108 (e.g., Facebook, Twitter, Google+, etc.), or the like or any combination thereof.

Content transferred or uploaded to the cloud storage system 107 from a mobile device (e.g., mobile device 104a) associated with a particular user can be downloaded, copied, or otherwise accessed using an auxiliary device (e.g., desktop computer 105) also associated with the particular user. Thus by access to the cloud storage system 107, a user can transfer or upload captured content from the auxiliary device 105 to one or more systems such as the content hosting system 106, the social networking system 108, or the like or any combination thereof. Likewise, content captured by a mobile device can be transferred or uploaded directly to the auxiliary device 105 (e.g., through one or more wired or wireless networks, or the like or any combination thereof), and thereafter be transferred or uploaded from the auxiliary device 105 to one or more systems such as the content hosting system 106, the cloud storage system 107, the social networking system 108, or the like or any combination thereof.

A user can transfer or upload, (i.e., "post") the captured content to a content hosting service 106. The content hosting service ingests the posted content and makes it available for sharing with others by giving it a network address and associated metadata. The ingest process may include transcoding of the uploaded or posted content to a form suitable for streaming to others on the Internet. It may also include performing one or more content recognition processes on one or more portions of the captured content (e.g., including one or more temporally- or spectrally-segmented portions of the captured content, an audio portion of the captured content, an imagery portion of the captured content, etc.), which include watermark extraction and/or fingerprint recognition, among other processes for ascertaining context and semantic meaning from the content that can be used to generate richer metadata automatically.

Captured content can be transferred or uploaded from a mobile device (e.g., smartphone 104a) or an auxiliary device (e.g., desktop computer 105) to a cloud storage system 107 automatically (e.g., as it is captured, after the capture process is complete, etc.) or through any separate process initiated by the user. The transfer of captured content can be performed as part of an auto-archive, backup, duplication or other "mirroring" functionality supported by the device's operating system or other native service(s) supported by the device. The content hosting system 106 and cloud storage system 107 may be operated by the same or different entities and, as such, they may be considered part of the same or different systems. For example, captured content can be transferred to a cloud storage service such as Apple's iCloud, and then a link to the transferred content (or a computer file in which the captured content is stored) can then be uploaded (e.g., at the user's request or with the user's authorization) to the content hosting system 106 and/or the social networking system 108. In another example, the captured content can be transferred to a cloud storage service such as Google Drive, which is associated with an entity that (i.e., Google) that also hosts the transferred content for retrieval by others (e.g., via YouTube) and/or enables the transferred content to be shared via social network (e.g., via Google+).

A user can share the captured content via a social networking system 108. The social networking system 108 may be operated by the same entity or a different entity that operates the content hosting system 106 and/or the cloud storage system 107. As such, at least two of the social network system 108, the content hosting system 106 and the cloud storage system 107 may be considered part of the same or different systems. For example, a user can upload or post the content to a content-hosting service, such as YouTube, and then share a link to the uploaded content (or a computer file in which the captured content is stored) via social networking services like FaceBook, Twitter, Google+, etc. In another example, the user can upload or post the captured content to a social network system (e.g., Google+) controlled by an entity (e.g., Google) that also hosts the content for retrieval by others (e.g., via YouTube).

In some embodiments, captured content that is uploaded to a network system such as a content hosting system 106, a cloud storage system 107, a social networking system 108, etc., can be accompanied by one or more items of certain metadata. For purposes of discussion herein, a network system receiving uploaded content can also be referred to as an "uploading system." Such metadata (also referred to herein as "upload metadata") can include sensor metadata, content metadata, device metadata, application metadata, or the like or any combination thereof, generated or otherwise in existence while the content was captured and/or uploaded, or generated or otherwise in existence within a some period of time (e.g., at least 1 second) before or after the content was captured and/or uploaded. To the extent that such metadata can be used to help build a more complete picture of the circumstances in which content was captured and/or uploaded, the upload metadata can also be referred to herein as "context information," "contextual information," or the like.

Sensor metadata can include the output of one or more sensors or sensing mechanisms of (or otherwise communicatively or logically coupled to or associated with) a device used to capture content. Examples of sensors/sensing mechanisms include ambient light sensors, moisture sensors, accelerometers (e.g., single- or multi-axis accelerometers), tilt sensors, barometers, altimeters, gyroscopes (e.g., single- or multi-axis gyroscopes), magnetometer (e.g., single- or multi-axis magnetometers), chemical sensors, electromyography (EMG) sensors, galvanic skin response (GSR) sensors, electrocardiogram (ECG) sensors, electroencephalography (EEG) sensors, thermistors, thermopiles, strain gauges, or the like or any combination thereof. Sensor metadata can also include the output of one or more position or location sensing mechanisms involving use of GPS, Wi-Fi or cellular tower triangulation, so-called "beacon" technologies (e.g., including any variety employing any suitable or desired Wi-Fi, Bluetooth, Bluetooth Low Energy, acoustic, or light-based technologies), or the like or any combination thereof. Sensor metadata can also include information describing the date and/or time when the content was captured or uploaded.

Content metadata can be obtained by analyzing the captured content. Content metadata can be analyzed at the device that captured the content (e.g., as the content is captured, or at some later point in time prior to or upon upload of the captured content) or by some other device associated with the capturing device (e.g., auxiliary device 105). Content metadata can include, for example, a color analysis or profile of any captured imagery, voice recognition outputs, facial recognition outputs, object recognition outputs, information describing landmarks in the data, stabilization information, or any other information extracted from the content of the data (e.g., the media content).

Device metadata can include information describing the mobile device that captured the content (also referred to herein as the "capture device") or that otherwise uploaded the captured content (also referred to herein as the "upload device"). Examples of device metadata include the device's manufacturer, serial number, etc. Likewise, application metadata can include information identifying application software that is present on the capture or upload device, as well as any metadata derived from data that may be processed by the application software (e.g., to implement a function on the capture or upload device).

Additional examples of upload metadata can include user preference information (e.g., describing media playback preferences), authentication information (e.g., describing a user name or ID, etc., registered to the user with the uploading system), lifestyle information (e.g., including food preferences), exercise information (e.g., describing information obtained by exercise monitoring equipment or wearable electronic activity trackers), subscription information (e.g., including information that keeps track of podcasts or television shows or other media a user subscribes to), contact information (e.g., telephone numbers, email addresses, etc.), or any information submitted to the uploading system by the user (e.g., including user information such as the user's age, date of birth, residential address, city of residence, state of residence, country of residence, zip code, gender, etc., content information such as a title for the uploaded content, a description of the uploaded content, one or more descriptive keywords or tags relating to the uploaded content, one or more links to other items of uploaded content, websites, network systems, etc.), or the like or any combination thereof.

The process of managing a particular instance of uploaded content includes: extracting information (e.g., identifying information, synchronization information, etc.) from the uploaded content (110); and using the extracted information to correlate (112) the particular instance of uploaded content with one or more other instances of uploaded content, with metadata associated with the other instance(s) of uploaded content, with metadata associated with the information extracted from the particular instance of the uploaded content, or the like or any combination thereof. In another embodiment, the extracted information (e.g., identifying information, synchronization information, etc.) can be used to identify one or more items of metadata associated with the particular instance of uploaded content, and the identified item(s) of metadata can then be correlated (112) with any other instance(s) of uploaded content, with metadata associated with the other uploaded content, with metadata associated with information extracted from the particular instance of the uploaded content, or the like or any combination thereof. Thus, various instances of uploaded content (and/or metadata associated therewith) can be correlated based upon information that is extracted from the various instances of uploaded content, based upon any metadata associated with the extracted information, or any combination thereof. The process of extracting information may include extracting auxiliary data (e.g., embedded by one or more digital watermark embedding processes), content fingerprint extraction and matching, or the like or any combination thereof. It is preferably accompanied by obtaining other context information about the capture and user from the mobile device from which the content was captured.

The process of managing uploaded content (and/or metadata associated with uploaded content) can (in addition to, or as an alternative to, the correlating discussed above), include using the extracted information (and/or metadata associated with the extracted information) to index into one or more source databases (e.g., associated with the uploading system or of one or more systems other than the uploading system) and recover therefrom uploaded content, metadata, etc., that is associated with the extracted information. This process of recovering other uploaded content, metadata, etc. (collectively referred to simply as "data"), that is associated with the extracted information, can be broadly referred to as a process of aggregating data and, more particularly as a first-stage data aggregation process. Additional stages of aggregating processes may be implemented, where each subsequent stage recovers uploaded content, metadata, etc., (i.e., "data") that is associated with data aggregated in a previous stage. Thus, a second-stage data aggregation process may be implemented to use data aggregated in the first-stage data aggregation process to index into one or more source databases (which may be the same or different from the source databases indexed into during the first-stage data aggregation process) and recover therefrom uploaded content, metadata, etc., that is associated with the data recovered in the first-stage aggregation process. Data aggregated from a source database can be appended to one or more databases supported by the uploading system (e.g., in association with the uploaded content, in association with information extracted from the uploaded content, in association with any metadata that is associated with the extracted information, etc.), or by any other database supported by any other network system. The appending of aggregated metadata can be performed periodically, upon the occurrence of a triggering event (e.g., as may be derived from recovered metadata, whenever new relevant content, metadata, etc., that is associated with extracted information, is found or provided, etc.), or the like or any combination thereof.

As generally depicted in FIG. 1, this process of managing captured content is distributed within the content hosting, cloud storage and/or social networking systems, but may be alternatively performed completely within the content hosting system 106, the cloud storage system 107, the social networking system 108 or any other system.

Generally, user-uploaded content is processed in the format in which it was uploaded to extract identifying information. Alternatively, the user-uploaded content can be processed to extract identifying information after it has undergone one or more pre-processing stages (e.g., involving transcoding, filtering, compression, etc., of the user-uploaded content).

Generally, uploading system processes the uploaded content to extract the information embedded therein (e.g., identifying information). Alternatively, the embedded information can be extracted by a device or system other than the uploading system. For example, captured content can be processed by a device associated with a user (e.g., by the user's mobile device or an auxiliary device) to extract the identifying information and append the captured content with the extracted identifying information (along with any relevant metadata, hashtags, etc.). The appended captured content may then be uploaded to the uploading system. In another example, the uploading system can record a pointer to the uploaded content, and pass that pointer to another process supported by another system (i.e., the content hosting system 106, the cloud storage system 107, the social networking system 108, or some other system) that fetches the uploaded content and extracts the identifying information. The extracted identifying information is then written back to the uploading system, or is written to another system where it can be accessed by the uploading system or by one or more other systems that access the uploaded content. Where uploaded content is attributed to a "user account" the extracted identifying information can be written to a network system associated with the user account (e.g., a system containing or managing a user profile associated with the user account) to enhance the user profile detail, assist in building a social network graph, etc.

As detailed further below, the acts of correlating various instances of uploaded content (and/or item(s) of metadata associated therewith) (also referred to herein as a correlation process) (112) can be implemented in various forms and computing arrangements, depending on the design requirements and features that the network service seeks to provide. One design constraint important in today's social media environment is immediacy: the ability to give instantaneous feedback to users about their upload or post, and uploads or posts by others while they are experiencing an event. Thus, the process of correlating user uploads or posts should be architected to cross reference uploads or posts of other users at the event within the expected immediacy. This functionality employs an architecture where the uploading or posting service ingests uploaded or posted content for many users in parallel (akin to a service like YouTube), extracts identifying information to identify the event (as well as capture time and location), and links uploads or posts from an event together so that related uploads or posts for the same event can be accessed by others. Then, over time, additional related metadata can be mined from within a social network and various other sources of metadata to add to the richness of the content that is aggregated and linked to the event, and made available for viewing, streaming, searching, sharing, etc., all via a cloud-based or like user-accessible network service. Whether provided in the immediacy of the event, or provided later after rich metadata has been mined and attached to the event, content hosting systems, social networking systems, or like network services provide a feedback path of the aggregated uploads or posts and metadata to user devices, including those seeking feedback from other users at the event as it occurs, and those experiencing the event via the network service.

Uploaded or posted content as well as related metadata, such as other user uploads or posts and metadata, is correlated using identifying information in the user-uploaded content. There are several forms of network services that are enabled by this process of correlating user uploads or posts and associated metadata by identifying information extracted or derived from the content. Here, we outline some examples, and then elaborate on additional examples below.

A compelling community of interest is created around a particular event by creating a network service that aggregates and synchronizes several uploads or posts of content from a particular event. One way to implement this community of interest is where the event has a network site within a social media service. The network services aggregates uploads or posts and makes them available for streaming and/or download via a network site. Users can share the experience by linking to the site (e.g., sharing a pointer or other form of link to the network site of the event).

The service can automatically add content to the site by executing a search for related metadata, and creating a mash up of it at the event site.

Of course, several variants of this approach are possible. Individual uploads or posts each may be provided with a unique network address, and then uploads or posts for an event can be linked together. One approach for interconnecting uploads or posts for an event is to link each related upload or post to a node in social graph representing the event.

Uploads or posts of audio and/or imagery for an event may be presented in aggregate at a particular network site. A common example is a web site, in which representations of uploads or posts are presented in a manner that enables the user to view uploads or posts, via various forms of networked devices, such as tablets, mobile phones and, of course, PCs. Various known approaches may be employed, including presentations of uploads or posts that the user can scroll through, news feed or blog post user interface constructs. For example, at this site, the uploads or posts may be displayed as thumbnail images of a clip containing audio and/or video content. The thumbnails are selectable to initiate a stream of content back to a network device.

Clips from one or more instances of uploaded content may be synchronized in time and space, and may even be stitched together for simultaneous and/or synchronized playback of uploaded audio and/or video content streams. Time codes embedded in the uploaded content or tagged to it using a synchronized time reference can be used to synchronize the time varying aspect of the audio or video content.

Time codes encoded as part of the embedded watermark in the original content will be inherently captured and uploaded. Time-codes extracted by the uploading system can be used to identity and tag/index a timeline of captured and/or uploaded content (which may have been edited, e.g., by the user, prior to upload).

Embedded time codes can also be extracted from captured content by a device associated with a user (e.g., by the user's mobile device or an auxiliary device), and then inserted into/appended to the captured content, before the captured content is uploaded to the uploading system. The inserted/appended time codes can then be read by the system to which the uploaded content is sent.

The audio and/or video content from multiple uploaded clips may be stitched, merged or otherwise combined together using any suitable audio or image stitching techniques, which may be augmented based on mobile phone location and orientation data captured from the orientation sensors (e.g., MEMS based sensors in the user's mobile device like accelerometers, magnetometers) and uploaded with the AV content. Digital watermarks can provide synchronization information, such as embedded time codes or timestamps, which enable different video uploads or posts to be synchronized in time. Once frames are synchronized, at least to some level of timing accuracy, then frame to frame correlation and/or audio correlation is used to match the spatial video content from different uploads or posts of video of a scene (such as concert stage) taken from different perspectives. Matching video portions from different uploads or posts are used to stitch together frames from the different uploads or posts. This video processing can be used to re-create an experience whereby users can request playback of video from a particular perspective of the performers at a concert, or can even navigate about an interactive playback experience, where the viewing perspective is changed, and the corresponding AV playback is updated to provide the AV as if the user where located at particular location relative to the performers.

Likewise, the audio may be stitched together to provide richer sounds based on a combination of audio uploads or posts, or to isolate different sounds at particular locations at an event. For example, the sounds from one location at a venue may be somewhat different and unique to a particular location relative to a nearby speaker or performer, and the user may navigate the site by choosing to listen to the audio captured at a particular location.

The fidelity of the sounds may also be measured, and those with higher fidelity prioritized for combination with other sounds of like quality to provide a much higher fidelity experience for those obtaining content from the event through the network service. This type of audio processing enables the audio that is prepared for streaming to users via the network service to be refined based on the different versions of audio captured at an event and uploaded or posted by users. One type of processing is audio artifacts detection and filtering. Abrupt noise (e.g., noise bursts in particular uploads or posts) as well as relatively uniform noise (e.g., background noise common to several uploads or posts) is detected and filtered out.

In addition to automating the aggregating of uploads or posts for an event, the network service may also index all of the uploads or posts and related metadata to facilitate an array of options for search. For example, users can search for content by event, by artist, by their friends, by location at a particular event, etc.

Before expanding upon these network services, we now turn to a description of embedding technology adapted for tagging content produced at events. We begin with background on digital audio processing, and then describe embodiments integrated within digital audio processing systems.

Digital Audio Processing

In digital systems, audio is sampled at some sample rate (44.1 kHz for CD quality, 48 kHz, 96 kHz, 192 kHz for digital mastering and studios, or lower for lower quality applications). Each sample has some number of bits, typically between 16 to 24 bits.

In software/computer systems, to permit efficient processing, the stream of audio samples is broken into equal sized segments (typically of one of the sizes 2048, 1024, 512, 256, 128, 64, 32 samples), with all the samples in that segment passed in a memory buffer.

When playing, capturing, or processing live audio, the audio data transported in these short frames of samples (e.g., from longer periods of 2048 samples down to as short as 64 samples) are passed at a regular interval to maintains the audio data sample rate. For example, 512 samples per buffer are transferred every 11.6099 ms for an audio stream sampled at 44.1 kHz.

Figure 2:
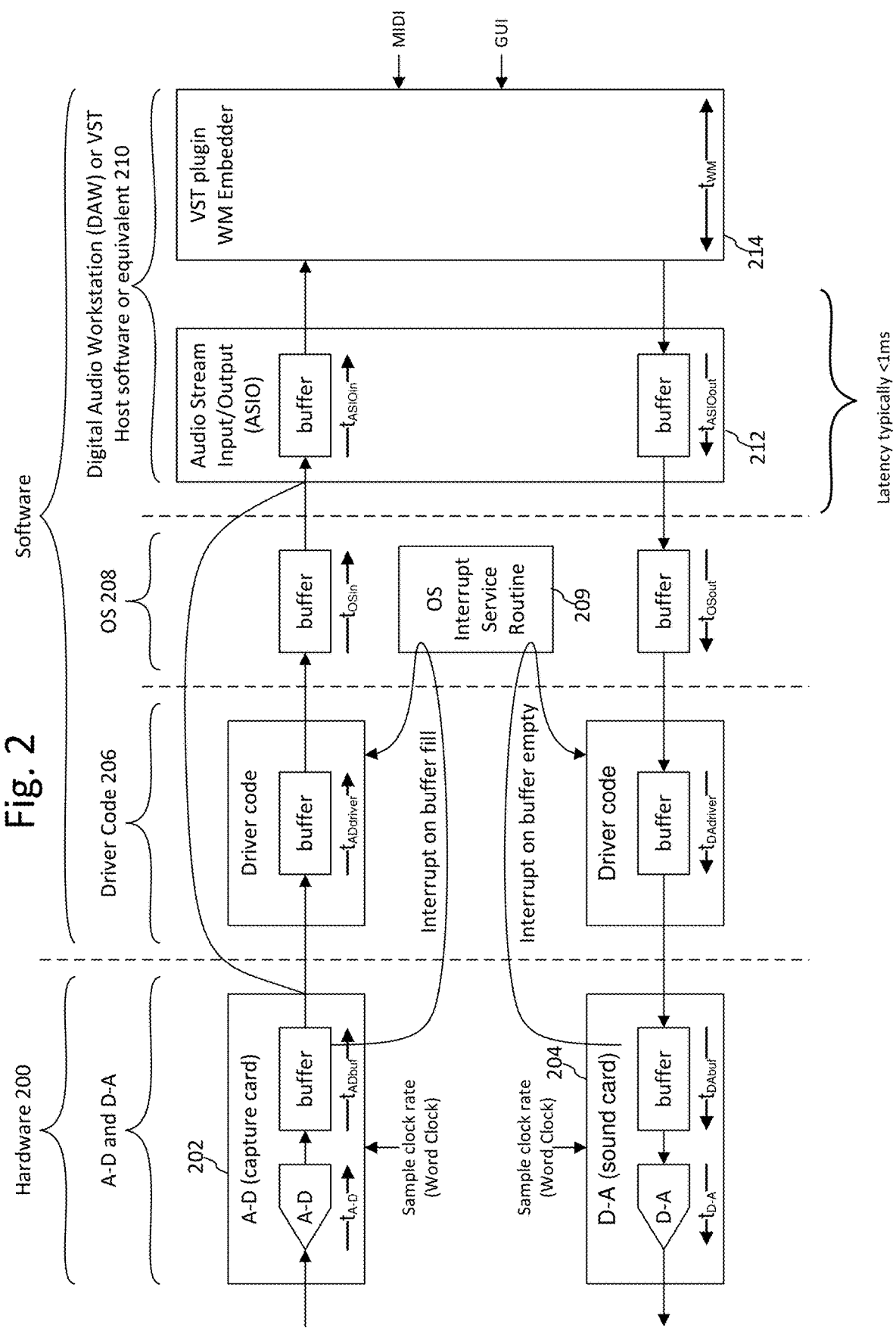
FIG. 2 is a diagram illustrating a combined hardware and software system for watermark embedding.

FIGS. 2-9 illustrate a variety of different software and hardware configurations of digital audio processing systems. FIG. 2 provides a generic depiction of computer-based, digital audio processing systems, which include hardware connected to a general purpose computer, and software running in the computer.

As shown in FIG. 2, the hardware 200 includes analog to digital (A-D) and (D-A) convertors 202, 204 for input/output of analog audio signals and conversion of them to/from digital audio formats. This diagram provides examples of an A-D converter 202, e.g., a capture card, and D-A converter 204, a sound card. These hardware components typically include A-D/D-A circuitry and buffers, as shown. Sound card latencies are determined by sample rate and buffer depth. Latencies can be very low if the buffer is configured to be small. Smaller buffers require more interrupts, and thus, more driver and OS overhead. Faster sample rates provide lower latency and more interrupt overhead. A minimum buffer depth is determined by response time of Interrupt, OS and driver. Buffer lengths of 64 to 256 samples are typical. Buffer lengths are longer for non-interactive or non-live work, whereas buffer lengths may be shorter in some systems. The minimum buffer length of a particular application is typically dictated by system and driver performance and total computation workload.

The software portion of the configuration of FIG. 2 includes driver code 206, operating system (OS) 208, and Digital Audio Workstation (DAW) or Host Software equivalent 210. VST refers to Virtual Studio Technology, a type of interface for integrating software audio synthesizer and effect plugins with audio editors and hard-disk recording systems, available from Steinberg GmbH.

Driver code software 206 provides the interface between the sound card and the software executing in the computer. Driver latency depends on buffer depth and sample rate. Longer buffers mean more latency and less software overhead. Minimum buffer size is determined by system performance to avoid buffer under-run and sound glitches.

The operating system 208 provides a service for communicating audio data from the driver to the DAW or host software equivalent 210. This service is shown as the OS Interrupt Service Routine 209. OS latency is determined by any buffering internal to the OS, and sample rate. Some buffers may be set to zero depth.

The DAW 210 transfers audio in and out via in interface such as Audio Stream Input/Output 212. ASIO is a computer sound card driver protocol for digital audio specified by Steinberg, providing a low-latency and high fidelity interface between a software application and a computer's sound card. Whereas Microsoft's DirectSound is commonly used as an intermediary signal path for non-professional users, ASIO allows musicians and sound engineers to access external hardware directly. ASIO infrastructure is designed for low latency, but the DAW software will inevitable add some delay. Other mixer software and plugins add software overhead or cause delay equalization to be used.

A digital watermark embedder is shown as a plug-in software component 214 of the DAW 210. In an example shown in FIG. 2, the embedder plug-in is a VST plug-in containing a watermark embedder software application program. Latency is wholly determined by application code plus a little for a VST plug-in wrapper.

Figure 3:
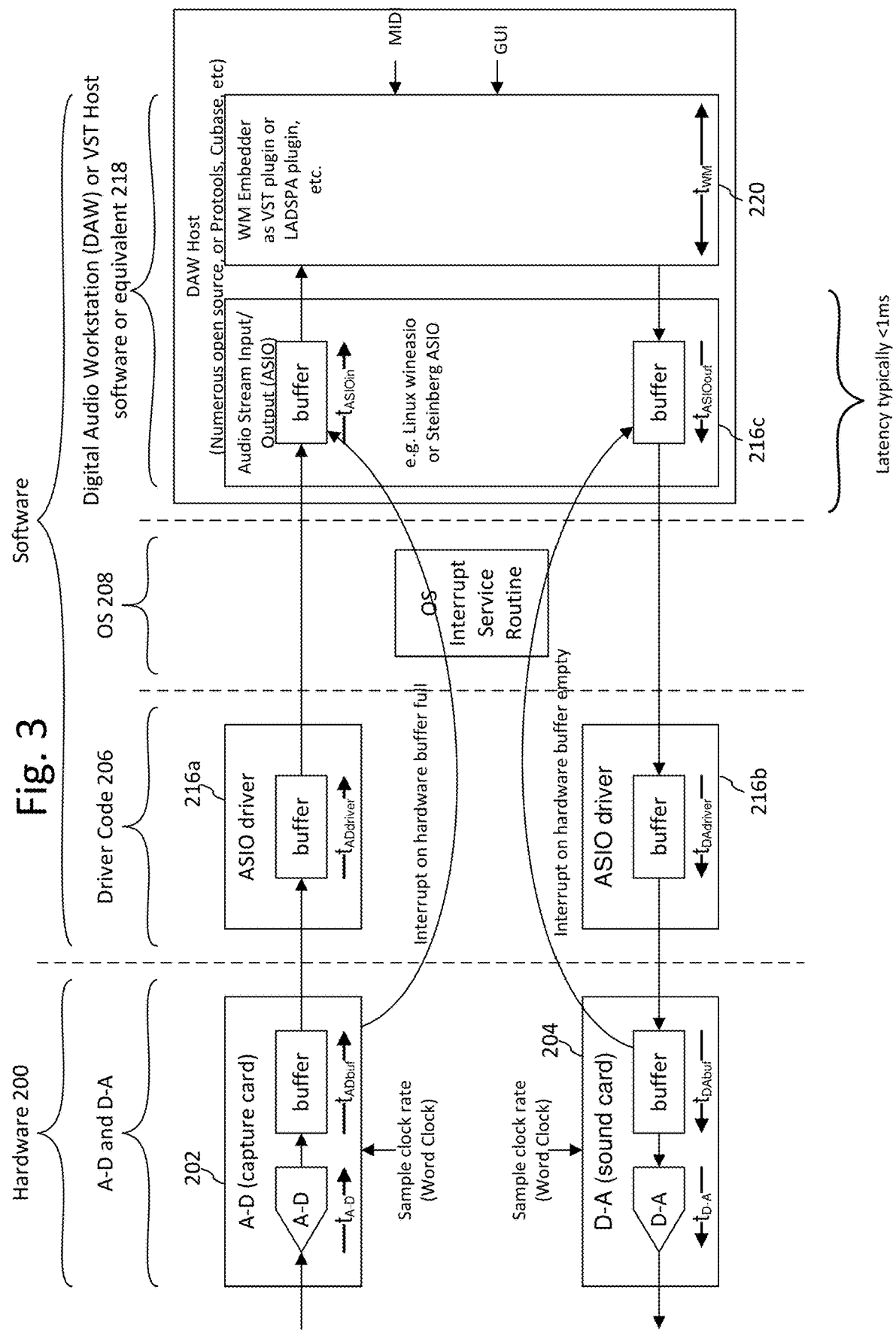
FIG. 3 is a diagram illustrating a combined hardware and software system for watermark embedding, using an Audio Stream Input/Output (ASIO) driver.

FIG. 3 is a diagram illustrating a combined hardware and software system for watermark embedding, using an Audio Stream Input/Output (ASIO) driver. The ASIO driver 216a, 216b, 216c provides a bridge directly to a sound card, bypassing OS drivers. There is no data path latency because the ASIO layer talks directly to hardware. Driver code does not need buffers for ASIO. The infrastructure is designed for low data-path latency, but software will inevitably add some delay. Buffers are kept short or not used in this implementation. Other mixer software and plugins can add software overhead or cause delay equalization to be needed. OS drivers, like Microsoft's DirectSound, etc. use a driver and extra buffering per driver layer. Older Windows based implementations use WDM Kernel-Streaming. ASIO software from OpenSource project, ASIO4ALL, allows ASIO access to generic AC97 soundcards. In an ASIO implementation based on FIG. 3, a Win kernel layer can be bypassed with an ASIO driver, Linux wineasio.

FIG. 3 also provides examples of alternative DAW configurations (218). These include plug-ins 220 like Linux Audio Developers Simple Plugin (LADSPA) or LV2 on Linux wineasio. Other examples of DAW include Apple Inc.'s Audio Units, Digidesign's Real Time AudioSuite, Audiobus, Microsoft's DirectX plug-in, Steinberg's Virtual Studio Technology (VST) on ASIO, and Protools (Avid) RTAS plug-ins.

Figure 4:
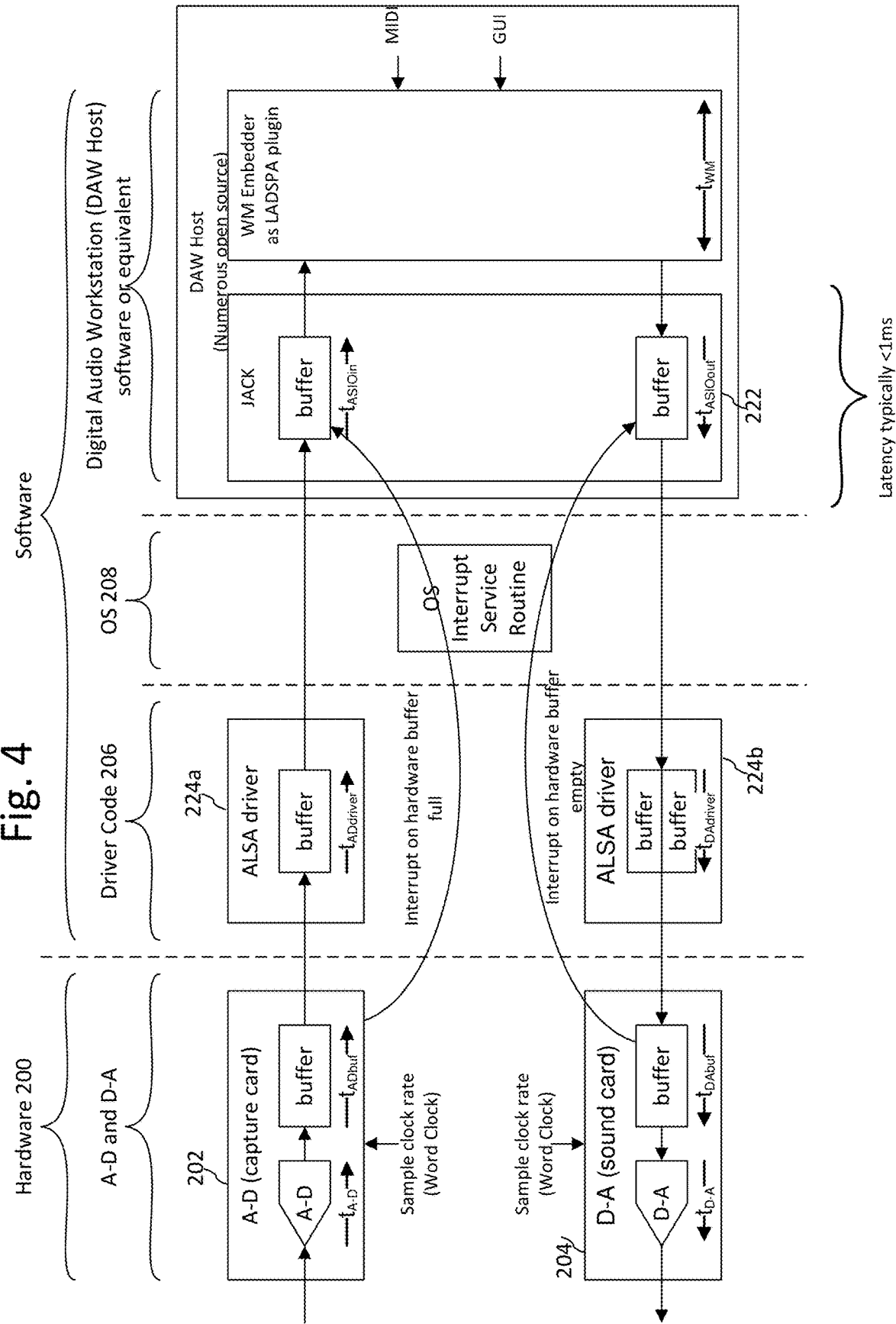
FIG. 4 is a diagram illustrating a combined hardware and software system for watermarking embedding, using the Jack Audio Connection Kit (JACK).

FIG. 4 is a diagram illustrating a combined hardware and software system for watermarking embedding, using the Jack Audio Connection Kit (JACK) 222. As depicted, the operation is similar to the configuration of FIG. 3, in that the ASIO interface enables the JACK embodiment to talk directly to the hardware. The drivers 224a, 224b are ALSA drivers. ALSA is Advanced Linux Sound Architecture, a free and open source software framework released under the GNU GPL and the GNU LGPL that provides an API for sound card device drivers. It is part of the Linux kernel.

Figure 5:
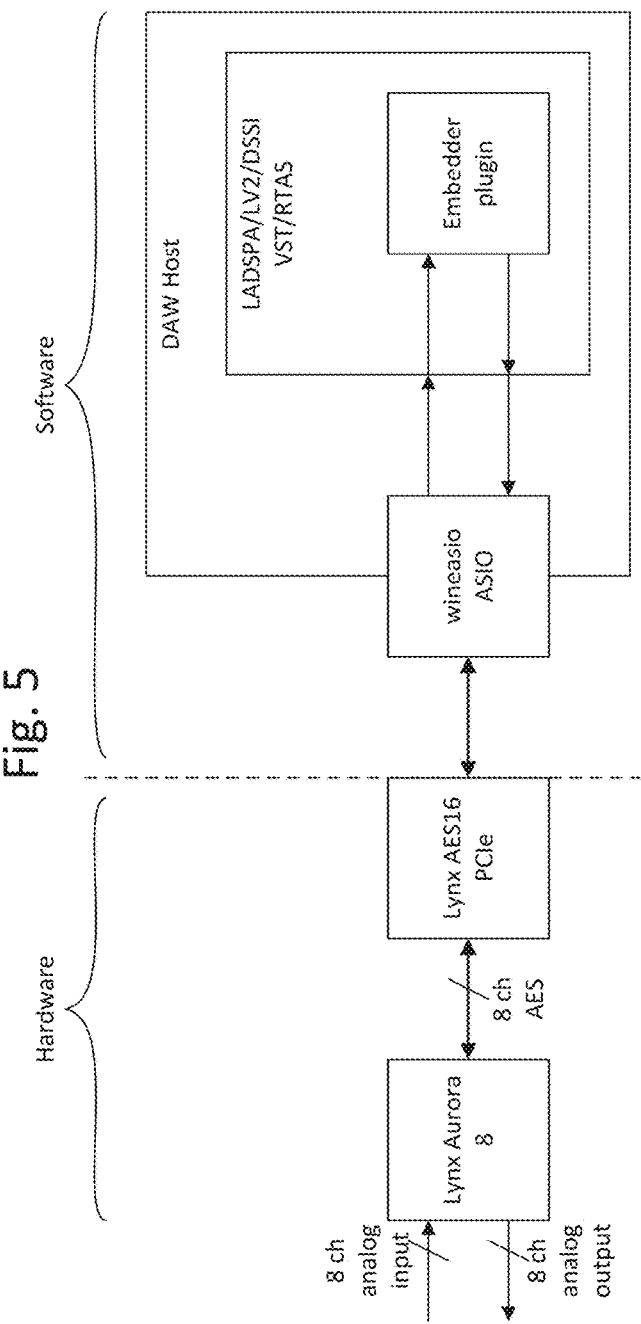

FIG. 5 is a diagram illustrating a combined hardware and software system, with a watermark embedder plug in. This diagram provides additional examples of A-D and D-A hardware. In this example, stand-alone D-A, A-D hardware is connected to the computer via a AES16 digital audio bus or PCI bus. WineASIO is an example of driver software. The DAW host uses a plug-in configuration, such as one of the examples listed (LADSPA, LV2, DSSI, VST, RTAS).

Figure 6:
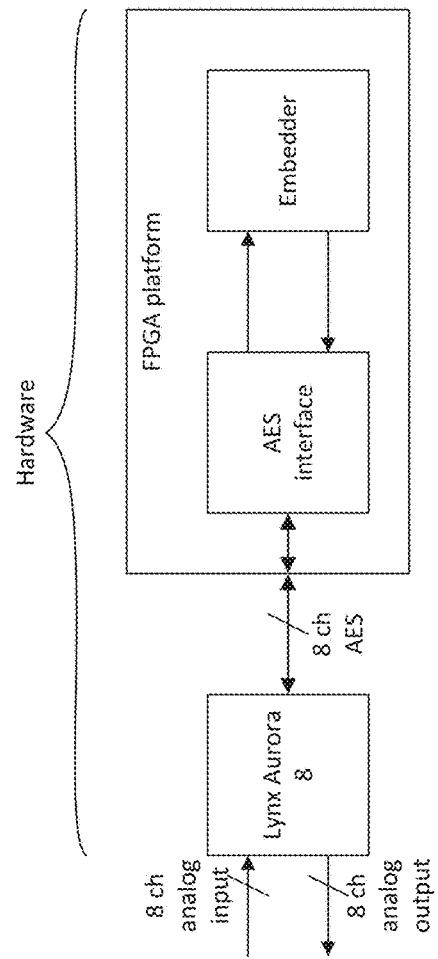
FIG. 6 is a diagram illustrating a hardware embedder.

FIG. 6 is a diagram illustrating a hardware embedder. In this configuration, there is D-A/A-D connected to an embedder implemented in an FPGA, through a digital audio interface, e.g., AES. The embedder software code may be compiled to run in an audio-card DSP or in FPGA/DSP acceleration hardware (ProTools/Avid style). The embedder algorithms may be directly implemented in logic functions implemented on an ASIC or FPGA. In one embodiment, the entire watermark embedder (A-D, though FPGA to D-A) may be implemented as a stand-alone unit. In another embodiment, the watermark embedder may be implemented as software to run on DSP within a DSP-based audio processing system. Various forms of interfaces may be used. Another example is a USB/FW interface to the A-D/D-A hardware.

Figure 7:
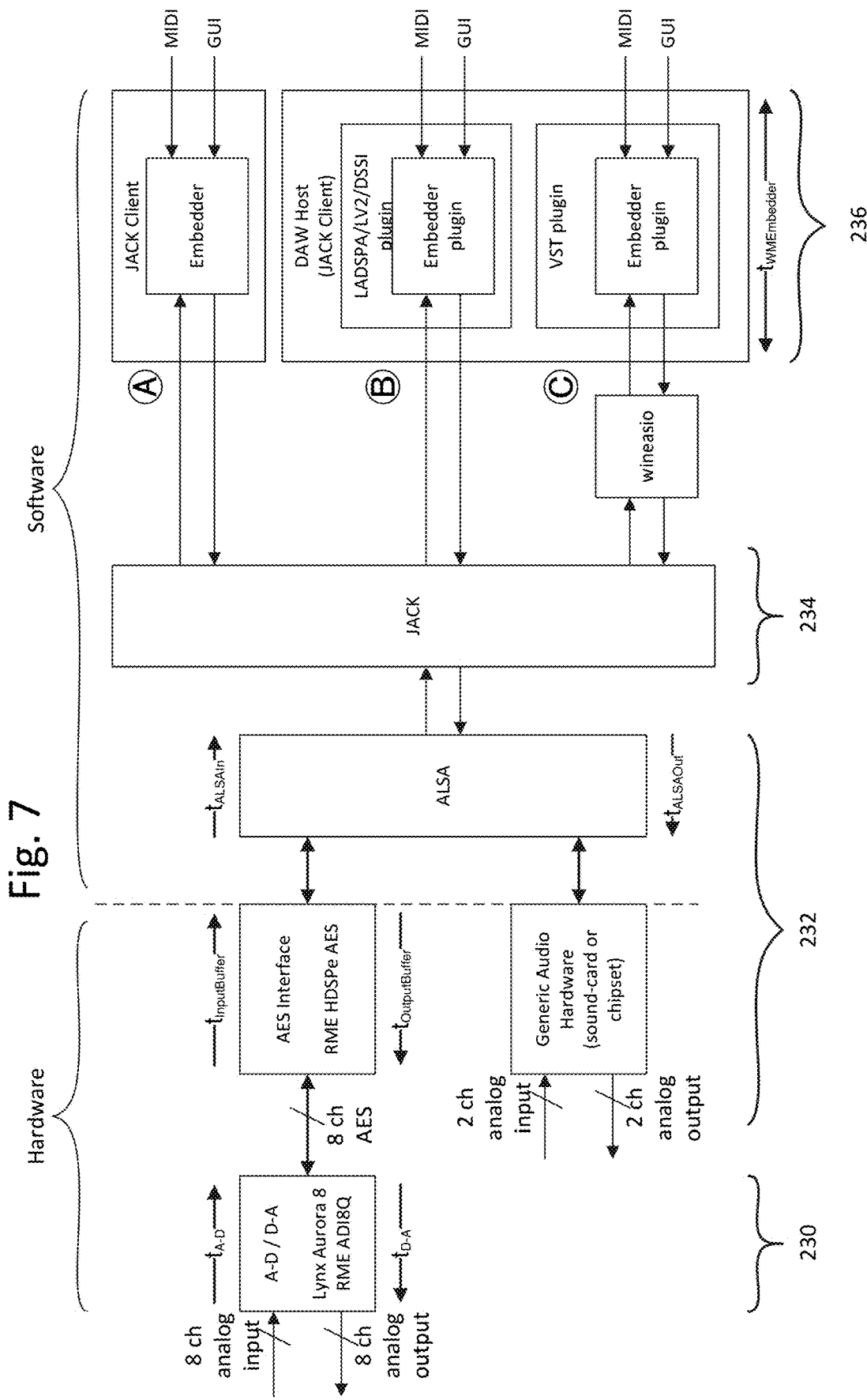
FIG. 7 is a diagram illustrating combined hardware and software systems, showing Linux hosted embedders.

FIG. 7 is a diagram illustrating combined hardware and software systems, showing Linux hosted embedders. The hardware section of FIG. 7 shows alternative embodiments, including one using higher quality, stand alone A-D/D-A convertors connected to the computer via an AES interface (e.g., via the PCI bus of the computer), and one using more generic audio hardware, such as a sound card in the PC or standard PC audio chip set with audio input/output. The software section of FIG. 7 includes ALSA drivers that interface with various embedder configurations via the Jack Audio Connection Kit. Then, there are three alternative configurations, A-C, of embedders. In one, the embedder is a JACK client. In the other two configurations, the embedder is implemented as a plug-in of a DAW host. Latencies are determined by sample rate and buffer depth. They can be very low if the buffer is configured to be small (32 or 64 samples). Smaller buffers imply more interrupts, and thus, more software overhead (OS and application code). Faster sample rates imply lower latency and more interrupts and software overhead. Minimum buffer depth is determined by response time of software servicing hardware. Buffer lengths of 64 to 256 samples are typical, with longer for non-interactive or non-live work, and shorter possible in fast systems. Minimum length is typically dictated by system and driver performance and total computation workload. Typical latencies for stages labeled within the embodiments of FIG. 7 are as follows:

230: Typical latencies 1 or 2 samples.

232: Total Input Latency typically <1.5 ms, e.g., 1.45 ms @ 44.1 kHz & 64-sample buffer; Total Output Latency typically <3 ms, e.g., 2.9 ms @ 44.1 kHz & 2$x$ 64-sample buffers.

234: No practical latency introduced by JACK.

At stage 236, an embedder receives data in frames of samples, where frame length is equal to the ALSA/hardware input and output buffer lengths. Frame lengths are typically 32/64/128/256/512/1024 samples.

Figure 8:
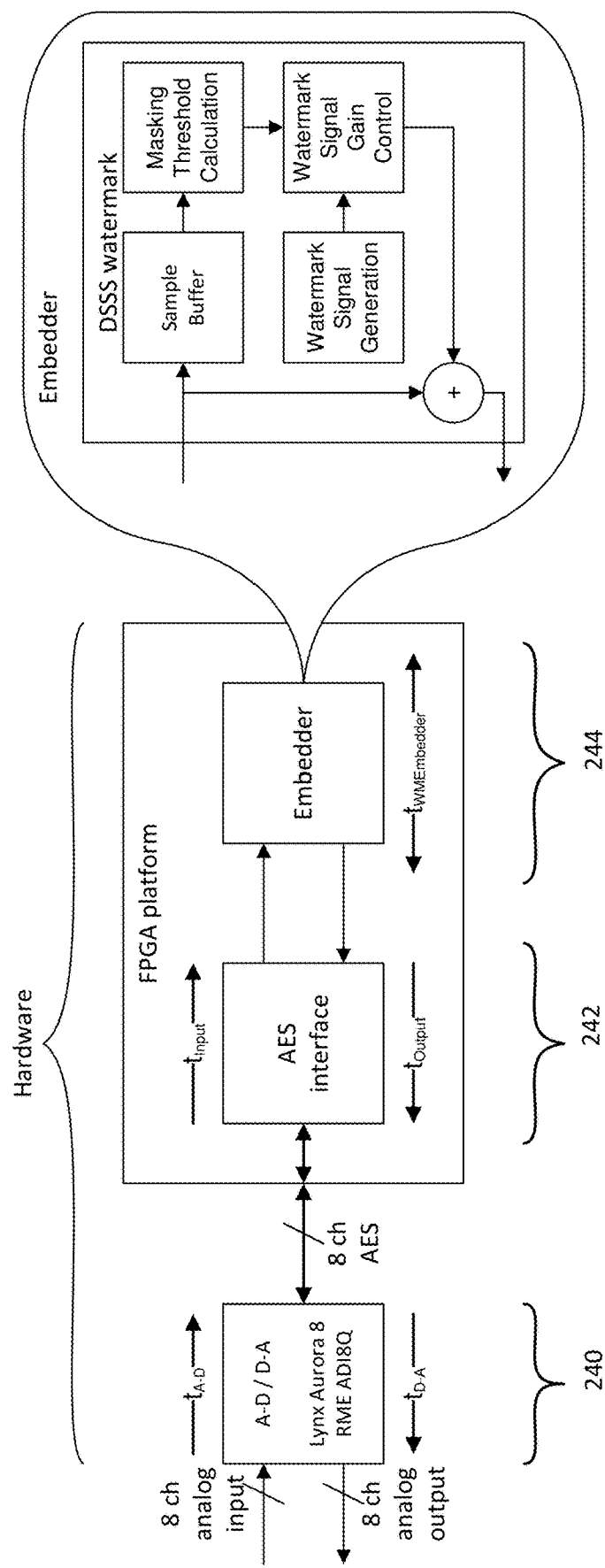
FIG. 8 is a diagram illustrating a hardware embedder with additional detail of a watermark embedder.

FIG. 8 is a diagram illustrating a hardware embedder with additional detail of a watermark embedder. In particular, FIG. 8 shows an expanded view of a watermark embedder in the configuration shown in FIG. 6. We provide additional description of a time domain Direct Sequence Spread Spectrum (DSSS) watermark embedder below, and in the patent documents incorporated by reference. In this embodiment, the latencies are determined by sample rate and total hardware sample pipeline length. They can be very low if total number of samples in pipeline is minimized to <10. Faster sample rates imply lower latency. Examples of the latencies per stage are as follows:

240: Typical latencies 1 or 2 samples.

242: Total Input Latency reduced to 1 or 2 samples; Total Output Latency reduced to 1 or 2 samples.

At 244, an embedder receives data as stream of individual samples. No buffering is required. Latencies in an audio stream can be minimized to 1 or 2 samples. The embedder may additionally store audio data internally to any depth for analysis.

Figure 9:
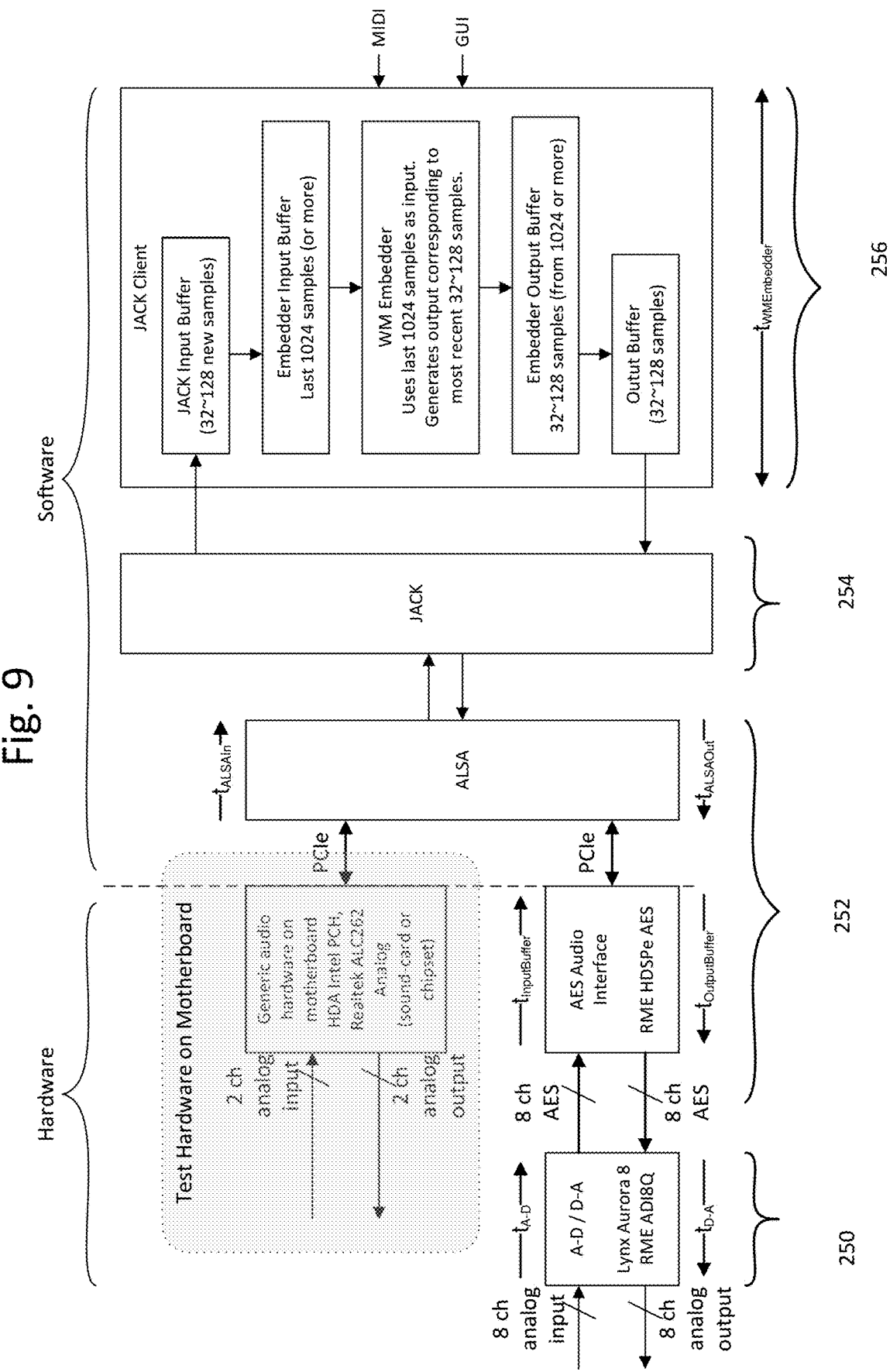
FIG. 9 is a diagram of yet another combined hardware and software system in which the embedder is implemented as a JACK client.

FIG. 9 is a diagram of yet another combined hardware and software system in which the embedder is implemented as a JACK client. The right side of the diagram provides an expanded view of an embedder for an implementation designed according to configuration A in FIG. 7. The embedder can be called less frequently than audio buffer transfer events to the JACK client containing the embedder. The Jack Client is called every time its input buffer is updated. The embedder could be called less frequently if necessary at the tradeoff of overall latency. Examples of latencies at stages in FIG. 9 are as follows:

250: Typical latencies 1 or 2 sample periods (20-40 μs @ 48 kHz).

252: Total Input Latency typically <1.5 ms, e.g., 1.33 ms @ 48 kHz & 64-sample buffer; Total Output Latency typically <3 ms, e.g., 2.33 ms @ 48 kHz & 2×64-sample buffers.

254: No practical latency introduced by JACK transport layer.

At 256, an embedder receives data in frames of samples, where frame length is equal to the ALSA/hardware input and output buffer lengths. Frame lengths are typically 32/64/128/256/512/1024 samples.

Typical computer implementations have a sound-card with an analog-to-digital convertors to capture audio samples, and digital-to-analog convertors to play back audio samples. The sound-card also works on audio samples transferred to/from the computer in short frames of samples.

When capturing audio, the sound-card captures a buffer-full of samples then signals to the computer that data is ready for collection. The sound-card hardware may also directly transfer the data to computer memory to a pre-allocated buffer space. The computer software will then take a small finite time to respond before it can further process this buffer-full of audio samples.

When playing back audio, the sound-card signals to the computer when it is ready for data, and the computer responds (when it is available to) by transferring a buffer-full of audio samples to the playback hardware. Typically, the playback hardware will make the request for the next buffer of data before the buffer being played back is empty, giving time for the computer to respond and transfer the next buffer of data, thus ensuring continuity of the audio data stream.

If there are delays in the computer or software (maybe another high priority process is taking place which prevents audio processing), then a whole frame of data may still be unavailable at the instant the next sample is required for playback or processing. This causes buffer under-runs which manifest as clicks and pops in the audio. Thus, additional buffers of data are kept queued up ready for playback in the sound-card hardware to ensure there is always a next sample ready to play back.

Additional queuing or buffering can be included in the hardware or software to give greater freedom for the system software and operating system in scheduling data transfers.

Where multiple channels or audio (e.g. stereo) are processed, each channel is captured independently and typically passed with its own buffers. Though some software systems can group multiple channels into one buffer, the audio data is still unique per channel.

In live audio processing, the managing software and system operating system are configured to ensure that the audio data processing and transfer to and from audio hardware is of highest priority.

To process live audio, there are two main issues:
1. Processing is fast enough to keep up with the audio data stream: the sample rate determines the total amount of data to process and the rate at which it must be processed; and
2. The buffer lengths used to transfer the audio data determine how frequently the computer must be interrupted to process the data: longer buffers mean less frequent interruptions and less computational overhead.

The overall delay (latency) between input and output audio-capturing a buffer of data before each processing step or playback causes a delay. The delay per buffer is equal to (number of samples in the buffer)/(sample rate). Latency can be reduced by reducing buffer lengths and increasing the sample rate, at the cost of higher computational workload due to a faster buffer processing rate. Reducing the number of buffers at each stage of the audio data path also reduces the latency.

Typically there are the following buffers (at a minimum) for each of the audio data path stages:
a) One for audio capture (typically late response by the computer is not critical here);
b) One in the audio transport layer for processing;
c) Two in the audio playback (2nd buffer must be there in case computer responds late, otherwise a click is heard);

A software process that operates on the audio stream will be called at the second step (b) when segments of audio are available in buffers in computer memory. The computation must be complete within the timespan of the audio segment held in the buffer. If computation takes longer, the resulting audio segment will not be ready for playback, and cumulative processing delay causes subsequent segments of data to be later and later, breaking any real-time processing capability.

Figure 10:
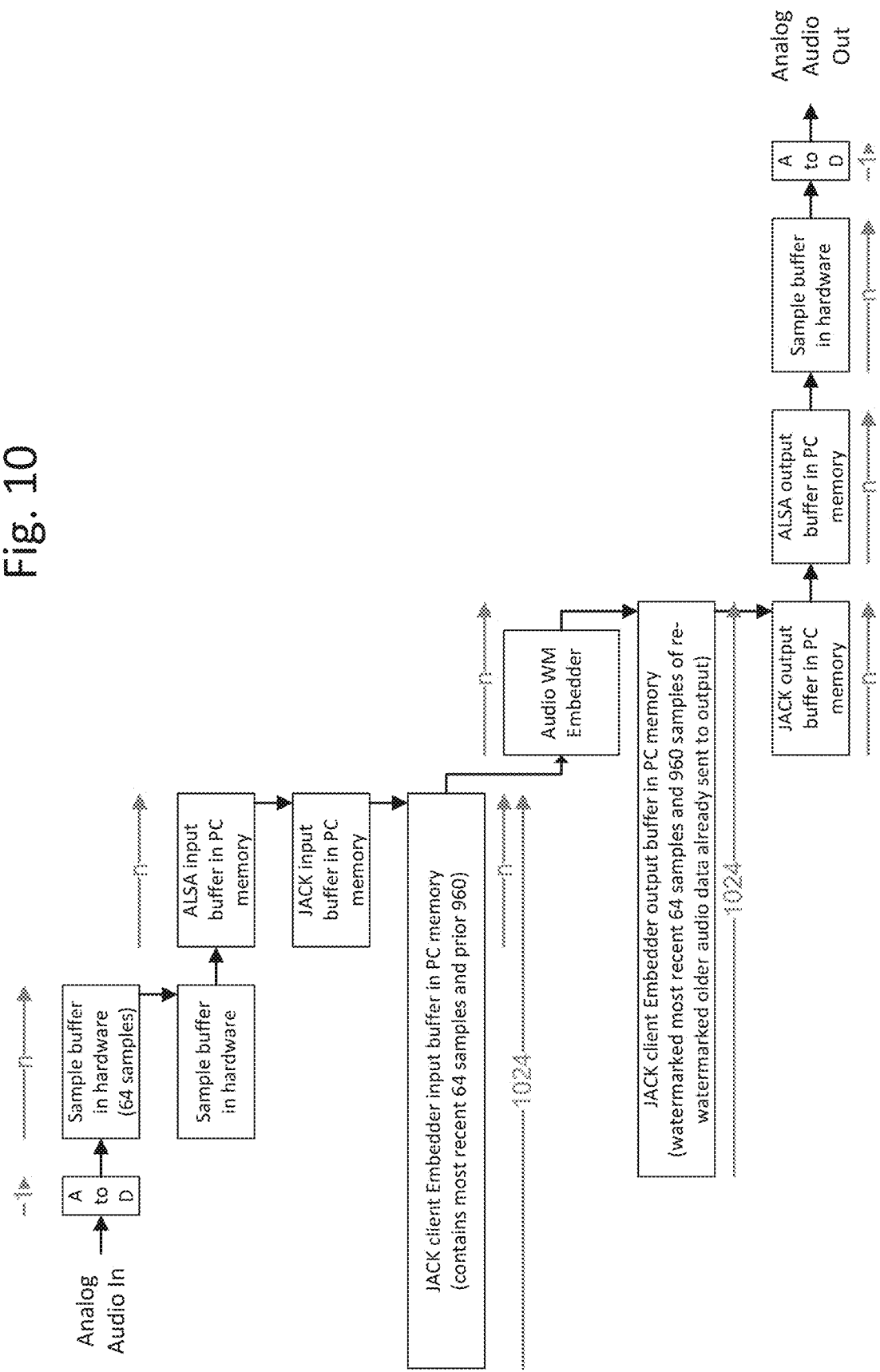
FIG. 10 is a diagram illustrating latencies associated with watermark embedding.

FIG. 10 is a diagram illustrating an example of the latencies associated with this digital audio processing. This particular example shows buffer configurations for an implementation with an ALSA/JACK interface between the hardware and embedder, like the one in FIG. 9. The buffer for watermark embedding has a length of 1024 samples, which is dictated based on the perceptual model, which uses this length of audio segment to compute the mask used to insert the watermark.

Live Event Audio Watermarking

Within this environment, we now describe a process of embedding a watermark into live audio at low latency in software in a computer. We also provide a hardware embodiment.

Audio watermarking involves insertion of a human-imperceptible but machine readable auxiliary data signal (also referred to herein as a "watermark" or a "watermark signal") into an audio stream. This signal is inserted subject to masking rules defined to ensure the inserted signal is imperceptible to the listener.

The perceptibility masking is a function of current audio, previously played audio, and upcoming audio, and the spectral content of the watermark signal to be added.

The watermark signal may be added to either the time-domain representation of the audio stream, or the frequency domain (e.g., within the human auditory range, or outside the human auditory range such as in the ultrasound frequency range). It will be appreciated that various combinations of any of these, and any other suitable or desired, types of watermark signals may be employed. For more background on such watermark signals, see U.S. Patent App. Pub. No. 2014/0108020 and U.S. Pat. No. 9,305,559, as well as U.S. Patent App. Pub. No. 2012/0214515, incorporated herein.

Frequency-domain insertion operates on longer segments of audio, which are usually overlapping in time. Issues of transitions between these longer segments are handled by windowing the signal content of the overlapping segments before re-combining them. The insertion method must avoid perceptible distortion or other artifacts at the transition from one frame to another (an audio equivalent of the block artifacts seen in over-compressed TV broadcasts, where the boundaries of compressed video blocks become noticeable to viewers.)

The audio stream is captured, processed (e.g., in an audio processing system at a venue), and played back to the audience at the venue as explained earlier. Watermarking is performed in the intermediate stage (processing stage), with processing performed at the time each new segment of audio becomes available. The watermark masking model calculation and watermark signal calculation use a much longer duration series of samples of audio data than are available in a single audio transport-layer segment. For example, the masking model uses a buffer of the most recent 1024 audio samples compiled from the most recent 8 segments of 128 samples, where when the next segment of 128 samples arrives, these are appended to the front of the buffer of 1024 and the oldest 128 discarded from the end; the masking model is computed again afresh each time. Refer, for example, back to FIG. 10, which shows this type of buffer arrangement.

Masking Model

The masking model uses history of sound to provide forward masking of watermark to be added. In live embedding, reverse masking cannot practically be done because future sounds are not available for deriving the masking from them. Waiting for future sounds to be captured causes a delay in being able to transmit the audio because these future sounds need to be captured and analyzed before the watermarked audio based on them is transmitted. Certainly, such reverse masking is possible where latency is not a concern, such as when embedding is not live, or where more latency is tolerable. In one of our embodiments for live embedding, the masking function only uses audio data from the current time frame (segment) and earlier ones.

The watermark masking process uses a longer duration sample of audio than is contained within a single segment passed through the software. This longer audio sample is needed to fully contain a broader range of audio frequencies than can be contained in a short few millisecond segment. Lower frequencies require at least a few hundred milliseconds of audio.

Each new segment of audio is added to the longer sample, in a rolling manner, such that the long sample contains the latest few segments comprising a few 100 ms of audio.

The masking model analyzes this whole audio buffer, which contains historical audio samples in addition to audio samples for the current segment being watermarked. All of this data is used for computation of the masking model needed for inserting watermark signal data into the current audio segment.

The buffer may also contain data for audio that is to follow on after the currently processed segment, permitting a more complete masking model calculation. Inclusion of data that follows after the currently processed segment requires either prior access to this audio data, since it has not yet been generated by the audio source, or the processing is delayed between input, processing and output, such that knowledge of the following audio can be found during this delay period. Or, as another alternative, access to audio data following the current segment may be obtained if watermarking is performed on audio data stored in files, where the whole audio file is available for examination from the perspective of any instant in time within the audio stream. This is possible where there are pre-recorded audio files that are watermarked at an event.

Some masking model computations are performed in the frequency domain. To get sufficient spectral resolution at lower frequencies, a longer segment of audio samples is required. Using longer segments of samples, though, result in poorer temporal localization of audio masking effects. Ideally, watermark insertion is exactly tuned to the frequency content of the audio signal at every instant in time. For more on audio watermark masking, including frequency domain masking and time domain masking, see U.S. Patent App. Pub. No. 2014/0108020 and U.S. Pat. No. 9,305,559, as well as U.S. Patent App. Pub. No. 2012/0214515, incorporated herein.

Time-Domain Watermark Insertion

In a form of watermarking called time domain insertion, the watermark signal is inserted directly sample-by-sample to the audio stream in the time domain. A process for time domain watermarking is:

1) A buffer of audio is collected, converted to a frequency domain, and that frequency domain representation of the audio segment is examined to determine the masking function.
2) Simultaneously, a segment of convolution-coded watermark payload data is taken and converted to the frequency domain.
3) The masking function is applied to the frequency-domain representation of the watermark signal.
4) The combined frequency-domain watermark is converted back into the temporal domain and added to the audio sample stream. Only the short segment of watermark corresponding to the current most recent segment of audio is added.

One example of time domain watermarking that may be applied using this method is called Direct Sequence Spread Spectrum (DSSS) embedding in U.S. Patent App. Pub. No. 2014/0108020 and U.S. Pat. No. 9,305,559, and time domain methods are also described in U.S. Patent App. Pub. No. 2012/0214515, incorporated herein.

Before embedding starts, the watermark data sequence is pre-calculated for the watermark identifying information (e.g., watermark ID) to be inserted. The embedded watermark sequence is repeated continually, or until the watermark information is changed, whereupon the sequence is re-calculated for the new watermark information. The sequence length may be as much as a couple of seconds.

For time-domain watermark embedding, a segment of this payload will be added to each segment of audio, with the data segment modified as a function of the masking model for the audio at that time.

The masking model can potentially be calculated afresh after each new audio sample, using the past N samples. This will give a better fitting of the masking model to the audio stream. This re-calculation with each sample can be achieved where the watermark embedder is implemented as a digital circuit on FPGA or ASIC (e.g., See FIG. 8).

Frequency-Domain Watermark Insertion

Frequency domain watermark insertion tends to be more difficult for real-time low-latency watermark insertion using certain embedding techniques for reasons explained below.

A process for frequency domain watermarking is:
1) A buffer of audio is collected, converted to frequency domain, and examined to determine the masking function.
2) Simultaneously, a segment of convolution-coded watermark payload data is taken and converted to the frequency domain.
3) The masking function is applied to the frequency-domain representation of the watermark signal which is then added to the frequency representation of the audio signal.
4) The combined frequency-domain audio plus watermark is converted back into the temporal domain and sent out as audio samples.

Overlapping the periods of data which are being watermarked is beneficial for minimizing audible artifacts. Audio data and watermark payload data are appropriately windowed prior to conversion to the frequency domain. Thus, when the final time-domain watermarked segments of audio are combined the transition from segment to segment is smooth.

A drawback of working with overlapping buffers is that the amount of overlap adds a further corresponding delay (latency) to the audio path (e.g., a half period overlap of 512 samples for 1024 sample segments being embedded will mean an additional 512 sample delay in the output audio, or about 10 ms at a 48 kHz sample rate.)

There is additional latency due to masking insertion of data into the frequency-domain, where the audio segment being transformed into the frequency domain is longer than the audio transport layer segments. This means audio data cannot be sent out until enough has been collected to process.

Some frequency domain techniques can pose additional challenges for live embedding. In one scheme described in U.S. Patent App. Pub. No. 2014/0108020 and U.S. Pat. No. 9,305,559, the same static watermark signal is added to frames of data for a longer duration, before changing to a complementary data pattern for the next period of time. In the next period, the complementary data pattern is reversed, which provides benefits in the detector by enabling the host signal to be cancelled and the watermark signal boosted by taking the difference of the signals in these two time periods.

Potentially, the watermark signal can be added incrementally in time, with significantly more computation.

The sampled audio signal is transformed to the frequency domain using an FFT, the watermark signal is added to each frequency bin, then the frequency-domain representation is transformed back to the temporal domain, by an inverse FFT, resulting in a watermarked audio stream in the time domain.

Real-Time Low-Latency Specific Issues

The masking model and watermark insertion can be computed more frequently, to allow supporting shorter audio transport buffer lengths. But this can be done only up to a point where the computation can be performed in the time available before the next buffer of audio data becomes available.

Accumulating overlapping watermarked segments may be unnecessary if computation is performed every new sample with fast hardware. In this case the latency can be dropped to one or two samples (in the order of a few tens of microseconds). The masking model will still use the most-recent N samples (e.g. 1024 samples).

Watermark Layering

Generally, audio content output at an event can be embedded with auxiliary data via one or more digital watermark embedding processes. Thus, audio content can be embedded with one or more "layers" of watermarks.

In one embodiment, embedding processes used to embed plural watermark layers into a common item of audio content may be carried out by a single entity or multiple, different entities. For example, a first watermark layer may be embedded into an item of audio content (e.g., a song) by a first entity (e.g., a record company or studio that recorded or produced the song, marketed the song, promoted the song, distributed sound recordings/music videos associated with the song, etc.), thereby generating a pre-embedded audio content item. This pre-embedded audio content item can then be output at the event (e.g., as discussed above with respect to mixing process 101b, either by itself or mixed with other audio). Alternatively, a second watermark layer can be embedded into this pre-embedded audio content item (e.g., either by the first entity, or by another entity such as a DJ) at an event (e.g., as discussed above with respect to embedding process 101a).

Generally, auxiliary data conveyed within different watermark layers will be different (although it will be appreciated that different watermark layers can convey the same auxiliary data). For example, and to continue with the examples given in the paragraph above, auxiliary data conveyed by the first watermark layer may include a first item of identifying information (e.g., a first watermark ID), a first item of synchronization information (e.g., one or more time codes, etc.), or any other information or metadata as described herein, or the like or any combination thereof. Likewise, the auxiliary data conveyed by the second watermark layer may, for example, include a second item of identifying information (e.g., a second watermark ID), a second item of synchronization information (e.g., one or more timestamps, etc.), or any other information or metadata as described herein, or the like or any combination thereof. It will be appreciated that the second watermark ID may be omitted if, for example, the entity for which the embedding process 101a is performed is the same as (or otherwise associated with or related to) the entity for which the first watermark layer was pre-embedded into the audio content item.

Generally, watermark embedding techniques used to embed different watermark layers may be of the same type (e.g., including time-domain watermark embedding, frequency-domain watermark embedding in the human auditory range, frequency-domain watermark embedding in the ultrasonic range, etc.), or may be of types that are orthogonal to (or otherwise different from) one another. For more background on such watermark embedding techniques, see U.S. Patent App. Pub. No. 2014/0108020 and U.S. Pat. No. 9,305,559, as well as U.S. Patent App. Pub. No. 2012/0214515, incorporated herein.

Different watermark layers may be discerned from a commonly embedded audio content item by employing different types of watermark embedded techniques to embed different watermark layers, by employing time-division multiplexing with one or more watermark embedding techniques, by employing frequency-division multiplexing with one or more frequency-domain watermark embedding techniques, or by employing any other timing/encoding technique. Before embedding a watermark (e.g., as part of the embedding process 101a), an item of audio content can be processed using a suitably configured detector to detect the presence of any pre-embedded watermarks in the audio content item. If any pre-embedded watermarks are detected, a watermark to be embedded into the audio content item (e.g., as part of the embedding process 101a) can be synchronized with the pre-embedded watermark and, once synchronized, embedded into the audio content item.

More on Managing Content

The above approaches for managing uploaded content offers several advantages. We highlight several of these advantages in the following section.

One advantage is that the content preparation and management system does not require changes in the functionality already present on mobile devices. There is no need to build and distribute application programs that users are required to download, install and use. The system can be operational, populating uploaded content immediately. Of course, the approach does not preclude such mobile application programs and supports $3^{rd}$ party development of applications and associated cloud services to exploit embedded data and facilitate posting, sharing, organizing or otherwise managing content and related metadata, for access by users via a network service.

Another advantage is that those responsible for distributing digital watermark embedding technology and performing the embedding need not implement back-end services for hosting and sharing content and social networking. Again, these entities are not precluded from doing so, yet they are not required to do so. Instead, others that provide such services, including those with substantial content hosting resources and members of their content hosting and social media systems, can offer additional services to their members by leveraging the identifying information from uploaded content. The extracted watermark identifying information (e.g., watermark identification (WM ID) numbers) is the minimum that a social media/data-mining service needs.

The approach is transparent to users during content capture and upload. In addition to not requiring special software, the approach further does not require the user to do anything different than a typical video/audio/image capture, followed by uploading or posting to a network site (e.g., associated with a content hosting system, a cloud storage system, a social networking system, etc.). Further, the uploading may be an action performed by the user, by a background process performed by the mobile phone system, or the like or any combination thereof.

The approach is mobile platform agnostic. In other words, it is not limited to one mobile operating system or mobile application program development ecosystem, and may be implemented using a compact (video) camera, audio recorder (e.g., digital voice recorder, etc.), laptop computer, and the like.

The approach is agnostic to the method used to capture or post audio/video content, or the method used to link to previously posted or 3rd party hosted content.

The approach enables clustering of uploaded audio/video content by ID, and thus users. It provides a wholly new clustering data-set currently unavailable. This can be more difficult to achieve via fingerprinting or other methods, as elaborated upon further. This is invaluable to cloud service providers such as Google, Facebook, Twitter, YouTube, Microsoft, Apple and others.

Ultimately, users get a richer payback of experiences about the event via their normal social media service. Users get more connections to other content and users who were at (or interested in) the event (e.g., a timeline map of all other captured content for a concert event), recommendations, localized services and information that was previously disconnected from with other users' experiences, as there were no means to correlate content captured by different users at the same event.

Use Cases

Use-case: Watermarking for social-media music/audio/video identification, grouping and feedback In this case, embedded identifying information in content captured by users at an event is used to group the content and related user feedback in a social network service. Digital watermarks providing identifying information are embedded in content that audience members are exposed to at event. Watermark reading is done by a 3rd-party, e.g., YouTube, Facebook, Vimeo, DailyMotion, etc., which then aggregates uploaded or posted content by event. This enables users to access the postings they have made as well as others have made for the event, as the postings and user commentary/feedback are correlated to the event by the identifying information.

Though perhaps lacking some of the advantages of watermarking, a related use case is to perform identification based on content fingerprinting, or various combinations of watermarks, fingerprints, and contextual information (such as GPS and time stamp) provided by sensors and other sources of contextual information on the user's capture device.

Variants of this use case are applicable to different types of events. One category of event is a public performance, such as a concert, theatrical performance, or movie showing. Some types of events are quite unique in terms of the related network services that are enabled, and as such, we break out additional use cases below. These, of course, can inherit similar functionality.

Use Case: Managing Posts from a Retail Environment

A related public performance is a promotional event or sale (or indeed, everyday operation of shopping venue that plays audio and video content through its AV systems). Identifying information from a capture of audio and/or imagery at a shopping venue enables several network services pertaining to product sales and promotion, including implementation of shopper rewards and product discounts. For example, shoppers are given incentives to post audio and/or imagery of experiences or products in the retail shopping environment that they particularly like. These are processed and aggregated at an online site for the store (e.g., the store website, or other online presence such as its Facebook, Instagram, twitter or other social media site) where experiences in the audio and/or imagery content are organized by product, retail department, shopper demographic, pricing or promotion. This enables shoppers to give and get feedback to/from other shoppers. It also enables the retailer to allocate discounts and store resources (such as sales assistants, inventory management, etc.) to products that are trending as popular from the AV posts correlated to a particular store, product or promotional sales event.

An additional layer of product recognition may be performed by analyzing posted video with object and product recognition processing. Digital watermarks, bar codes and other symbologies encoded on products and shelves facilitate such identification from AV captured of the product, and enable the AV posts of these AV captures to be tagged with, and linked to product sites providing product information and opportunities to learn more about products and to purchase them.

Use Case: Multi-Player Games

Another category of event is a networked multiplayer game, where users are distributed at different locations. Though at different locations, players of a game are engaged in a common AV experience of the game, as it plays out, rendered on the user's AV equipment (TV, stereo, etc.). By embedding a game event related ID, the AV content of the game may be captured by the user and posted to a service. The service, in turn, extracts the identifying information, and cross references it to the game. This enables many variants on the gaming experience. Examples include, restarting the game from the capture point, replaying portions of the game, changing the outcome of the game by varying how it plays out relative to the history of the game at or around the point of capture.

As noted, watermarking and/or fingerprinting, plus context information, can be used to correlate posts to an event. Below, we compare/contrast aspects of using watermarking vs. fingerprinting. Of course, advantages may be gained by using them in a complementary fashion, along with contextual information from the capture device. (Key: + good or possible, − bad or not possible, WM=watermarking, FP=fingerprinting)

+ WM can be read to group matching uploads without needing any database search

+ WM with time-stamp gives multiple-upload event synchronization and grouping 3rd party can generate additional cross-linking of uploads and cross-identification, and linking IDs of original postings + WM No app required for mobile users who generate the web video/audio content + WM Marked content is available as soon as it is posted; it can be scanned once and necessary databases populated with extracted ID numbers − FP based identification cannot discriminate between different events with the same music or audio entertainment − FP needs audio capture, fingerprint generation and database update before any identification can be done
− FP, due to delay in capture and fingerprint calculation, then time for a database update, the social media grouping/identification of user posts cannot be a live interactive operation. This makes it more difficult to meet live social media interactive behavioral style of "now."
− FP fingerprint analysis of uploaded audio/video has to be re-run every time database is updated to be able to fully identify and group content.
+ WM watermark IDs can be read and stored to social database once, immediately, grouping can start instantly, and audio never need be re-examined. WM can be read in cloud or in an application or operating system program, or by social media server farms.
+ WM Live embedder hardware only needs small traffic (or none if configured in advance) to post embedded IDs
− FP must have high bandwidth internet link to post live audio stream for fingerprinting, or intensive computation and posting of data to database (complex/proprietary).
− FP may have music/audio licensing issues for each venue/performer/production group if audio is streamed off-site for fingerprinting.

The methods for managing posts are applicable to both live and pre-embedded audio/AV.

*Live material watermarked at an event, show, gig, play, nightclub, airport, or anywhere with speakers. Theatres may embed live per film showing.

*Pre-recorded and pre-embedded material could be artist's music embedded and uploaded to the web (to Soundcloud or YouTube for example), or embedded by the hosting servers on upload or playback. This could include radio/TV broadcasts or DVD/CD/Blue-ray, and cinemas/theatres.

*Audio is downloaded or streamed from a web service to individuals/users which is watermarked with a unique ID for each user/download (user may have unique ID each download/streaming event). This ID can be tied across social posters who share a piece of music/audio/AV.

Content ID, Location ID, and Timestamps

A digital watermark may be embedded in audio or video so as to provide a constant unchanging ID for a piece of music/ay. In this type of identification, the watermark ID is the same for that piece wherever it is played. This is typical for content played from CDs or DVDs or pre-watermarked content being played anywhere at any time. The watermark ID could be changed to allow sub-identification of content that has been localized, or to track usage and spread of content though a particular channel (e.g., played at an event, but shared socially, or re-purposed/mixed subsequently.) Individual music downloads (from iTunes, Soundcloud, etc.) can be marked uniquely per user or unique per track.

This tracking can be performed by repeating the content identification process for content, each time it is uploaded, posted or linked. The embedded information identifies information about the original event. Additional contextual information provided at the time of posting or linking enables the system to build a more complete picture of the content, such as:

contextual information about the user, and time and place of posting can be evaluated to determine whether the content is being re-posted;

identification of other content in a new posting not associated with the event, indicates that the content has been mixed with other content; and a search for existing, previously embedded watermark layers as well as insertion of a new watermark layer may be performed each time it is posted, or made available for sharing, to enable tracking of generations of posting or sharing activity.

For location-specific audio/AV, the WM ID can be set uniquely for a location. The ID number(s) allocated by query to the watermark ID server, which assigns ID numbers to the embedder services or live embedder hardware/PC/Digital Audio Workbench (DAW)-plugin. DAW plugin is a software plug-in for a digital audio workbench, such as Audacity, Cubase, Ardour, etc. The plug-in requests watermark IDs as required from the ID server. Other hardware could be pre-loaded with IDs or configured via USB, Firewire, or MIDI, on the fly during production.

For live events or live events playing pre-recorded (or not pre-recorded material), the ID is inserted by watermarking performed live by inserting that ID as part of the AV production flow at the sound booth.

The watermark ID can be allocated for the event and location. This ID can be changed for each piece played, changed per musician or artist at an event, changed per track played, or scene or act in play or theatrical production.

The watermark ID may also include a continuously incrementing time-stamp to give unique identification of a particular time within the event. This time-stamp only needs to change slowly, such that a time-stamp transition from one value to the next is captured within a typical shortest audio/video clip length recorded (e.g., in increments every 10, 15, or 30 seconds). Exact alignment of the audio can be performed with only one time stamp event, and shorter clips can be bracketed to within a short time window.

During production at an event, watermark ID numbers can be advanced by the AV/Sound/Lighting engineer, DJ, or studio engineer. The ID may be changed or advanced via a MIDI interface to the real-time watermark embedding system to simplify integration with standard AV and musical equipment. For example, a MIDI command sent from a control surface or keyboard, PC running a MIDI service or DAW signals to the watermark embedder that the ID should be changed.

Other Aspects of the Audio Watermark Insertion and the ID Database

The watermark ID is registered back to an ID database, directly by the DAW or watermark embedder software or hardware, or by manual user interaction though a web-site, or even by the watermark server itself. Metadata to be associated with the identifying information (e.g., watermark ID) can also be entered into the ID database through one or more suitable user interfaces supported by a MIDI interface or DAW plugin to the watermark embedder, by a web-site associated with the watermark server, etc. The metadata can be entered into the ID database before, during, or after content has been produced, or otherwise output, broadcast, streamed, recorded, etc. Although metadata is generally described herein as being entered into the ID database, it will be appreciated that one or more items of metadata can be stored in any other suitable database or location. If the metadata is stored separately from the watermark ID, then association with the watermark ID can be made using any suitable approach (e.g., including one or more, pointers, links, or the like or any combination thereof, between the identifying information and the metadata).

Some examples of types of metadata that can be entered include synchronization information such as the aforementioned time codes, and/or timestamps, timestamp ranges, etc., indicating (e.g., by date and/or time, etc.) when a watermark ID was inserted into produced content, indicating when a watermark ID was removed from produced content, etc. (though such information may not be known exactly until the watermark ID is inserted into or removed from the produced content). The synchronization information can be used for many purposes, including to facilitate the generation of a log of expected signal strength of the embedded watermark, to facilitate embedding of multiple watermark layers into the content, etc.

Other examples of types of metadata that can be entered (e.g., into the ID database, or one or more other databases) for association with an item of identifying information and/or synchronization information include: information identifying an event, venue, etc., for which the content is (or was, or will be) produced, performed, output, broadcast, streamed, recorded, etc.; information describing the location of the event, venue, etc., where the content is (or was, or will be) produced, output, performed, etc.; information describing the time and/or date of the event, etc., the time and/or date when the content is (or was, or will be) produced, output, performed, etc.; information identifying the artist, DJ, performer, producer, sound engineer, etc., associated with performance, production, output, broadcast, streaming, etc. of the content; information identifying the owner of (e.g., copyright owner, etc.), or other party or entity associated with, the content that is (or was, or will be) produced, performed, output, broadcast, streamed, recorded, etc.; information indicating characteristics or descriptive features of the content that is (or will be) produced, output, broadcast, streamed, recorded, etc. (e.g., including title, duration, type, genre, theme, etc.); one or more textual documents such as research articles, news articles, commentaries, reviews, press-releases, transcripts, messages, alerts, etc. (whether written by a person, generated by a computer-implemented speech-to-text transcription application or service, etc.), associated with any of the above-mentioned information or any other suitable or desired information (and, if such textual documents are available on a website, then web-links thereto can also be included as metadata); one or more computer audio or video files (e.g., having any suitable of desirable file format for storing digital audio or video data on a computer system) containing an audio or video representation of a textual document (whether spoken by a person, generated by a computer-implemented text-to-speech or other speech synthesis application or service, closed-captioning system, etc.); one or more items of content (e.g., an audio file, a video file, an image file, a haptic signature file—e.g., as described in U.S. Patent App. Pub. No. 2012/0028577, which is hereby incorporated by reference, etc.) which can be rendered (e.g., via imagery, sound, haptic cues, etc.) to a user of a mobile device); information identifying or describing one or more types of watermarks (e.g., audio, image, video, etc.) that are conveyed by the produced content; a system identifier identifying the audio processing system 100 used to produce the content, etc.; links (e.g., hyperlinks) to any of the above-mentioned types of metadata; or the like or any combination thereof.

Another example of a type of metadata that can be entered (e.g., into the ID database, or one or more other databases) for association with an item of identifying information and/or synchronization information includes one or more items of content policy information. Generally, content policy information includes information relating to how (or which) services shall be rendered by the uploading system in regards to the uploaded content.

For example, content policy information can include access information describing how (or whether) access services (e.g., permitting posted or uploaded content to be viewed, shared, or otherwise used at or by a content hosting system 106, a cloud storage system 107, a social networking system 108, etc.) should be applied to the posted or uploaded content. Access information can be provided in terms of one or more territories (e.g., states, countries, etc.) where viewing, sharing, etc., of posted or uploaded content is either permitted or banned. Content policy information can also include content rating information describing an age range of viewers for which the uploaded or posted content is intended to be viewed.

Content policy information can include monetization information describing, for example, how (or whether) monetization services (e.g., permitting posted or uploaded content to be monetized) should be applied to the posted or uploaded content. Monetization information can, for example, describe whether or not advertisements can be presented during viewing of posted content, what advertisements can be presented during viewing of posted content, what types of advertisements can be presented during viewing of posted content. Monetization information can also describe what payments or other royalties are due to the content owner as a result of revenue generated by presented advertisements, etc.

Content policy information can include tracking information describing how (or whether) tracking services (e.g., permitting posted or uploaded content to be tracked by the uploading system or some other system) should be applied to the posted or uploaded content. Tracking information can be provided in terms of numbers (e.g., cumulative, daily, monthly, etc.) of views, "likes," comments, shares, etc.

Content policy information can include rendering information describing rendering services (e.g., permitting posted or uploaded content to be rendered when users of a content hosting system or social networking system—also referred to herein as "system users"—watch, view, listen to, play, share, comment on, etc. the uploaded or posted content) to be applied to the posted or uploaded content. Rendering information can, for example, describe a default or preferred screen resolution, audio/video playback rate, etc., with which the uploaded or posted content should be played, a player skin to be visually rendered on displays of devices (e.g., smartphones, laptop computers, desktop computers, wearable devices such as Google Glass, etc.), one or more software plugins to be used when playing the uploaded or posted content, one or more application functionalities (e.g., supported by an application running on a device associated with a system user) to be enabled/disabled when playing (or sharing, or "liking", or commenting on, etc.) the uploaded or posted content.

Content policy information can also include marketing information describing how additional information relating to the marketing, pricing, sales, distribution, licensing, advertising, branding, performance, etc., of the uploaded or posted content (or of content, products, and/or services associated with or otherwise related to the uploaded or posted content) should be presented or otherwise made accessible (e.g., by hyperlink, etc.) via the uploading system.

Another example of a type of metadata that can be entered (e.g., into the ID database, or one or more other databases) for association with an item of identifying information and/or synchronization information includes metadata update information indicating that one or more items of metadata such as that described above will be provided, revised or otherwise updated within a specified period of time (e.g., 24 hours) or by a specified date. The period of time and/or date may be specified by the entity responsible for uploading or posting the content to the uploading system using any suitable approach.

Another example of a type of metadata that can be entered (e.g., into the ID database, or one or more other databases) for association with an item of identifying information and/or synchronization information includes embedding policy information. Generally, embedding policy information includes information relating to the operation of the watermark embedder. For example, embedding policy information include instructions that, when executed by the watermark embedder, prevent the embedder from embedding a watermark, cause certain information (e.g., a particular item of identifying information, synchronization information, etc.) to be embedded instead of (or in addition to) information that is currently (or was previously) embedded into the produced content, cause the embedder to embed a watermark by applying a particular masking model to one or more portions of the produced content (e.g., a section of the produced content may be benefitted by special care in embedding to, for example, minimize the likelihood that the embedded watermark will be perceptible to listeners, etc.).

DJs mixing tracks live for house productions or events watermark their mix using a low-latency live watermark embedder. Any captures of the audio/video have the watermark embedded in that captured content, and can be identified. The watermark ID for the event allows instant identification by the content hosting systems, cloud storage systems, social networking systems, and the like. Fingerprinting may not be practical for live events because the audio has to be sent specifically by the producer/venue/DJ/artist to a fingerprinting service, or processed locally then the results of that processing posted to the fingerprint database. It takes time to analyze the audio, and further time to update the fingerprint databases.

Content Capture and Upload

Currently users can capture content (e.g., including audio and imagery) and upload the captured content to numerous content hosting systems, cloud storage systems, social networking systems, etc.

Capture and posting is typically done directly by an application program on the user's device. For example, a YouTube mobile application captures video from the mobile device's camera and streams the video for posting to a network site. The posting may be immediate, or after the video is captured at the posting site, previewed and edited by the user. Other alternatives for user capture include the user capturing sound or video with the sound recorder application or video mode of the phone camera, then subsequently uploading that captured content in a second operation. The upload may be made directly through a social media site (Facebook, Google+), which in-turn stores the audio/video to the YouTube content hosting service or another web-hosted database. Alternatively, the user uploads audio/video to YouTube/Soundcloud first, then posts a link to the uploaded content through their social media page (e.g., Facebook). Posts of captured audio/video held on the smartphone and posted some time later after the event will still be identifiable to when they were taken, separate to the upload date.

Within seconds of posting, the social media site or hosting service identifies the upload, populate event/location/time/date information in the posting, and trigger feedback to the user and friends or other attendees. The watermark provides interactive services without need for any additional application programs.

No special process is needed by the user for in-the-cloud based watermark recovery and audio/video identification or ID number extraction. No applications need installing, coding or maintaining.

The user-base immediately includes everyone who posts audio or imagery, and rapidly can include others who are friends or social graph-connected to those who do post content.

The process is transparent to the user. He/she need not even know or be aware how the audio/video is identified, or that it is identifiable. The embedded watermark ID provides a deterministic, yet transparent way of communicating event information and timing for synchronizing captures of the content at the event. The service for clustering content and metadata, including user posts (e.g., text input providing commentary or feedback in the style of "Tweets" and the like) becomes available directly once the server-side process is running and embedded audio is being generated.

As an example, at a concert, the user may want to capture a video of a particular act to post to their friend on Facebook. The video camera mode is turned on, content captured, and posted to the Facebook page immediately. The user will get "likes" and comments back from friends, and typically continue to interact with these while at the event. As another example, the user may capture video to post at some later time (e.g., at the user's discretion), or may never even post it. In either case, the user's mobile device may upload the video as a background archiving process, at which point the video or audio watermark ID can be recovered and the user can be alerted that metadata is available to attach/append to the uploaded content if so chosen.

In many cases, the user does not want to be distracted by needing to install and start a separate application program to identify content, and use extra battery life processing that content on their phone. The use of a separate application is less preferred, as installation of the application may take some time, the phone may be low on application memory, and registration or learning the application is needed separate from knowing how to use their phone video camera.

While some of the examples above indicate watermark detection "in the cloud," it is also relatively efficient to perform watermark detection in the mobile phone after or as content is being captured on that phone. A mobile phone running a watermark identification application is still compatible with this workflow. In this case, the mobile phone provides the extracted watermark identifying information, including any synchronization information with the corresponding AV content stream to the network service. The network service, in turn, uses this information to correlate related content, and metadata, cluster the content and metadata, and make it available to users that post the content as well as others whom the users share it with or follow the event or the posters.

Watermark Recovery and Use of Recovered Information

In embodiments where watermark recovery is performed server-side in the cloud, the search process can be more advanced than methods used in a mobile application equivalent watermark reader. The posted audio or video may be re-examined forensically once indication of a watermark is found. The watermark search can also be more computationally intensive if required, doing additional searches such as speed and time/pitch shift correction, that are less favorable for a mobile phone watermark reader.

Multiple sequential uploads or uploads from a particular geo location of a single user can be examined, or searched for, based on collective knowledge of watermark IDs already found, or other users who post content from the same location (location provided as meta-data in the upload (GPS/cell network, IP address), or gleaned from posters comments or from social media "checkin" to a location.)

In a social media context, posting about, commenting on, linking to, Facebook "liking," tweeting about, +1'ring on Google+, etc., then triggers an analysis of the posted audio/video to extract any potential hidden watermark IDs. The extracted watermark IDs then are stored in the database/social graph along with all the rest of the post information. Extraction of the watermark is performed by a behind-the-scenes service which examines all posted audio/video that is linked to or uploaded. This content need only initially be examined once. An application loaded into a user's social media page (say a Facebook App) may also be used to examine posted AV content, or open a link to such posted content, and recover any watermark identifying information, including synchronization information.

When the cloud-based social media service recovers a watermark ID, it can use the ID as a unique identification number without needing to know any additional information about the event. Searching and clustering of similar matching event IDs or associated IDs can be done directly upon this ID number.

The social media system (e.g., Facebook, twitter), can then do a sort/search of their database for other recovered watermark IDs to find matches by other users. Searches may also be performed by web-crawlers, spiders or collected from other users' searches.

Upon receiving the watermarked posted audio/video content or link, and finding watermark IDs, the social media system informs the user of others who are currently posting or have recently posted a matching piece of audio/ay. Similarly, it informs users of others, friends, or close connections who are at the same event.

Furthermore, additional metadata is recovered from the ID database where information has been entered in association with one or more items of identifying information, synchronization information, etc., as explained previously. This information can include: an index of other ID numbers used at the same particular event; other ID numbers previously used at the venue (e.g., at different times/days); metadata entered about the event by the service/production/venue/artist, which can include artist name, location, venue name, GPS grid reference, time and data, web-links, social media site links, production/mixing information, links to lyrics, score or script, etc.

Additionally, the social media searches fill in additional information about the posted audio/video by gathering information from the posted comments by the user or other users also posting comments "Can't believe I got in to XYZ", and from information gathered across a collection of unrelated users posting similar watermarked audio clips from the same event.

The above approaches enable several ways to aggregate, organize, and cross-correlate postings. The social media system, for example groups a combination of both the database list of watermark IDs used for an event and multiple users posting audio/video captured from that event, potentially with different ID numbers, or at different days/times. Grouping by venue, artist, or production company are all also possible.

Still further, by combining databases and social-media graph searches, searches based on a watermark ID recovered from a captured audio clip posted from an unknown concert can yield where the event is/was, who else was attending, friends who are attending who did not know the original poster is/was attending. Multiple layers of linking and searching back- and forth allow recommendations for posts to be made directly from the watermark ID recovered.

When an audio/video clip is posted and examined, immediately the OP/user can be located in time and space by cross-referencing the ID back to either the watermark ID database, and/or other users who have posted audio/video clips with corresponding or identical watermark IDs. The user can have event information links returned (stage or set times, track listings, theatre scene/act times), links for venue information (where the bar, restaurant, restrooms, are located, upcoming events), information on upcoming performances by the same artist/production group, etc.

As posts to social media and audio/video uploads to YouTube are made live, the cloud-side watermark recovery can immediately provide information which can be fed back to the user/OSP, or others at the event or friends/contacts. "Did you know that these people are also here?<list of names>", "See more videos posted by others attending . . . "

In services such as Google Music, the user can "upload" their music from their phone or computer (music they may own on CD or MP3 or bought from iTunes, etc.). Google then identifies that music, but does not need to store it. Then the user is permitted to stream that music, free of charge, at any time back from the music service, receiving the original content at best quality. With watermarking based identification, an uploaded piece can be identified from a concert, and the option to purchase that or associated material provided based on the watermark ID found. A live production will likely not fingerprint to match the original material (unless the artist is playing lip-synch to a recording.)

The watermark identifying information may also be used to indicate location of content with particular attributes, which triggers processing useful for those attributes. One such situation is where content is mixed live at an event (such as DJ playing over radio or at venue). In this situation, the live manipulation of the audio is expected to introduce tempo or pitch shifts. These types of audio manipulations are signaled within the audio processing equipment, and trigger insertion of watermarks that identify or "flag" the manipulations. Additionally, the watermark ID and metadata databases can contain flags to indicate particular optimizations for the watermark search, correlated to watermark identifying information or synchronization information, indicating where these attributes are located relative to synchronization markers (such as attributes linked to timestamps). If the user can be located to a particular event or location at time of upload, a lookup is made to the database to determine additional information about the production of the audio at the event and the environmental conditions at the event. This information is then used to adapt the watermark reader configuration. Where there are known forms of audio distortion associated with the audio produced and captured at an event, the watermark reader configuration is adapted to counteract these distortions. For example, where there are distortions that introduce time or pitch shifts in the audio, the determination of these distortions triggers compute intensive time/pitch shift searches. This could yield watermark IDs from pre-recorded tracks (or even assist in fingerprint analysis of the same if no watermark is found).

Artists/events/producers can search for posts which contain captured audio/video from their events, and look for comments/feedback.

A mobile phone running a watermark identification application is still compatible with this workflow if the user chooses to use one.

A mobile phone application can save computation power by directly uploading the captured content to a web-service which does the watermark search and extraction. This web-service can perform much more compute-intensive analysis (such as time/pitch shift correction and deeper forensic searches, even based on prior knowledge of currently playing events) than would be available on a smartphone with limited computation power and battery life.

In one embodiment, audio/video clips from an event found across all posters are displayed in a time-line for viewing, commenting, and giving thumbs-up/down to quality or content. A user can play though these using the best selected path, or jump between them for different views, find a clip for a piece missed at the time of the event (user was busy reading Facebook posts and missed capturing a moment on camera.)

The captured content can be located using watermark timing between left and right (or more) audio channels. Such deep analysis allows the social media service to give feedback where friends are in relation to each other within a crowd.

As demonstrated above, watermarking identifying information with synchronization information enables many ways to exploit posted content for display, consumption and interactivity. Extraction of synchronization information from several posts of the same event enable the service to synchronize the posts, and combine them in new and useful was. For example, timestamps extracted from audio watermark enable the service to group posts by time and perform temporal alignment of multiple video-clips. Then, once aligned (or within a frame period), the service can then generate a 3D image reconstruction of the venue/event using bundle adjustment. A frame-by-frame version of still image 3D reconstruction as used by Google, for example, in their latest mapping software which takes photos posted with a tag (e.g., "Rome Coliseum") and rebuilds a 3D map of the building. Relative spatial location of the videos can be aided by timing information in the watermark, where salient feature extraction may fail from other noise or mismatches in sound distribution around a venue.

Watermarking and Content Fingerprinting

In the above, we have touted the benefits of the deterministic nature of digital watermark detection, its ability to differentiate similar content, and facilitate immediate correlation of content posted during live events, among other advantages. Content fingerprinting offers a means of recognizing content as well, though the latency of registration of the fingerprint, and the non-deterministic nature of its recognition does create trade-offs relative to watermarking. Nevertheless, content fingerprinting can enable some of the system features, particularly when paired with additional contextual information sensed by the mobile device. This contextual information can be used to distinguish events having similar content, for example.

In this section, we highlight some of the benefits and drawbacks of watermarking and content fingerprinting. We envision that both can and will be used in a complementary fashion. For example, the management service can seek to detect a watermark and finding it, proceed to perform various services described above. In the absence of a watermark, it can use content fingerprinting and/or other sensor data from the mobile device or gleaned from the social network from the poster to provide means to identify content and the event where it originated.

A few differentiators between watermarking/fingerprinting. (+ good or possible, − bad or not possible)

Watermarking
+ handles microphone and speaker distortion (from over amplitude);
+ handles interfering noise, especially at large magnitude, in venue;
+ can distinguish between venues or events with same audio;
+ low database activity for WM/event updates (if any needed);
+ no database activity needed for grouping/clustering by 3rd party examining samples, database only if additional tagging required;
+ database lookup is on known id #, no "closest match" search required;
+ event/track/piece ID can be tagged and metadata provided by originator/producer;
+ IDs can be pre-allocated in database before event, or configured after;
+ live production of pre-recorded material can have a watermark embedded into the recording, or a watermark embedded locally to contain identifying information. A local watermark embedder is needed for live productions.

Also, house mixes of pre-recorded media creates new content that may need a local embedder, but will give instant ID recognition. One embodiment is a smartphone application program for watermarking imagery/audio prior-to/during upload to content hosting systems, cloud storage systems, social networking systems, etc. Another embodiment is a plugin program for a DAW to embed audio on way out, which allows house DJs to mark content, without extra hardware cost. Another advantage of watermarking is that it enables rights management of posted videos/audio. In particular, the ID enables easier search for Youtube, etc. to find all potential content by screening content for IDs encoded within watermarks in the content, at upload or in scanning previously uploaded content that is hosted on the site's servers.

+ voice/video-conference call can be read for WM without privacy concerns;
+ mobile reader can cache WM read ID results during the day for later review and lookup in a database. Mobile device only stores small quantity of IDs, no audio.
+ analysis of posted clips only needs doing once to extract WM IDs;
+ live embedder HW only needs small traffic (or none if configured in advance) to post embedded IDs;
+ no agreements required for streaming audio to fingerprinting service (artist rights management, copyright, content theft risks);

Fingerprinting
− high database traffic in live updates;
− database must be searched to correlate events and perform grouping of corresponding events;
− database search for fingerprint matches rather than lookup, no exact match per query;
− additional database structure to group multiple successive fingerprint samples together;
− interfering noise prevents identification (can be local to each recording);
− microphone distortion (e.g. clipping) will hamper recognition;
− local nulling in sound-field might impact recognition;
− needs feed from each live event with fingerprinting back to database. The feed can be delayed to a block upload.
+ live production of pre-recorded content can be identified in database if all material is previously fingerprinted;
− audience or crowd noise, and other sound will interfere in the fingerprint matching (e.g., vehicle engines, announcers (not part of the production being fingerprinted), echoes at a venue, noise of the user's hand touching the microphone, etc.

– house mixes of pre-recorded material are difficult to match to prior fingerprints, needs live fingerprinting and lengthy database updates;
– voice/video-conference call reading has privacy issues;
– mobile reader cannot do background reading without using network to access fingerprint servers. There is too much audio data to cache otherwise.
– Youtube/social/cloud posted clips may need re-analyzing (big compute load) whenever fingerprint database is revised;
– must have high bandwidth internet link to post live audio stream for fingerprinting, or intensive computation and posting of data to database (complex/proprietary).
– There are potential music/audio licensing issues for each venue/performer/production group if audio is streamed off-site for fingerprinting (artist rights management, copyright, content theft risks).

Watermark Embedding

Figure 11:
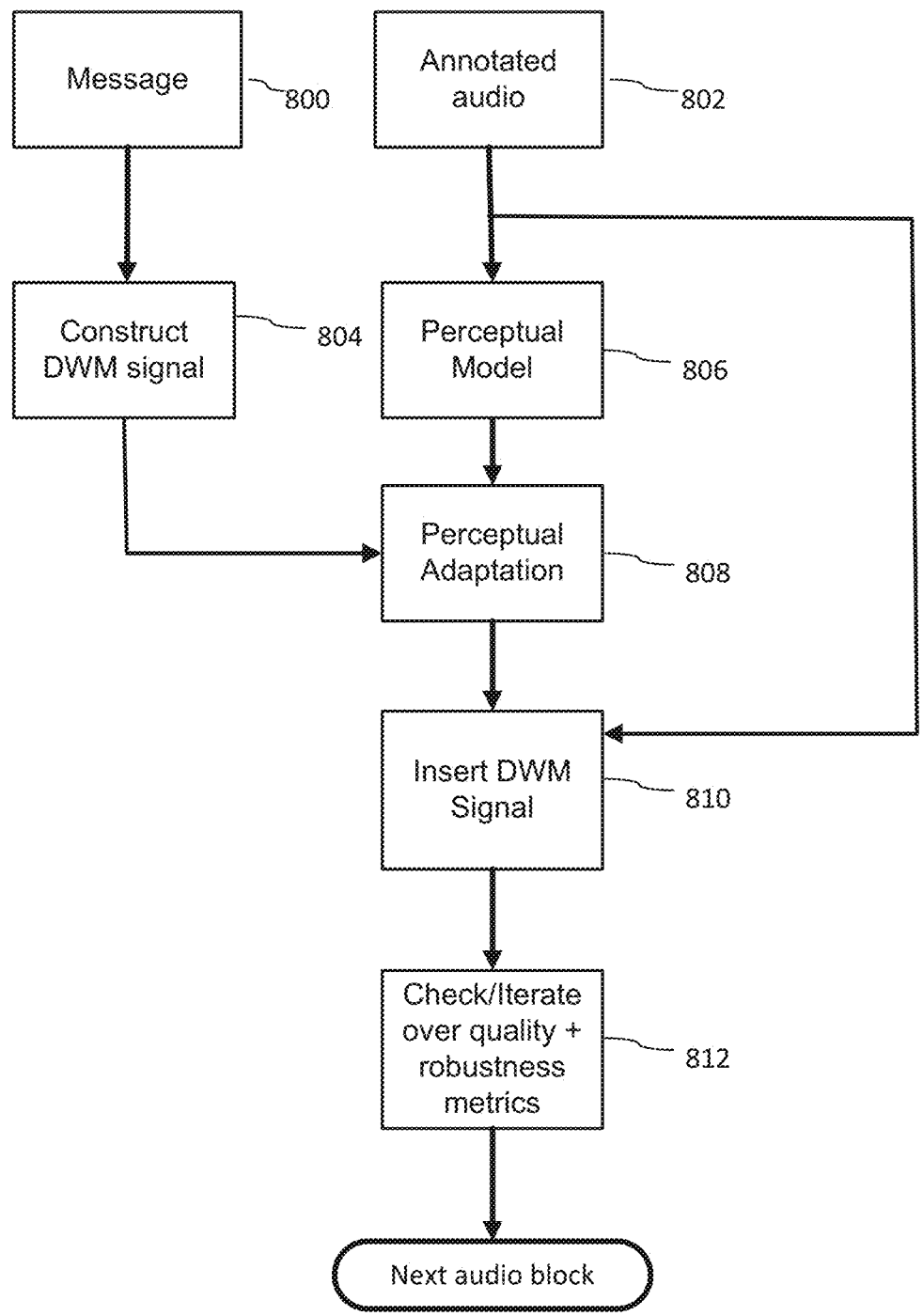
FIG. 11 is a diagram illustrating a watermark embedding process.

FIG. 11 is a diagram illustrating a process for embedding auxiliary data into audio. This diagram is taken from U.S. Patent App. Pub. No. 2014/0108020 and U.S. Pat. No. 9,305,559, in which a pre-classification occurred prior to the process of FIG. 11. For real-time applications, pre-classification involving audio signal analysis is not likely to be performed, as it would introduce additional latency. However, metadata from the audio processing system 100 may be used to provide audio classification parameters to facilitate embedding. The input to the embedding system of FIG. 11 includes the message payload 800 to be embedded in an audio segment, the audio segment, and metadata about the audio segment (802) obtained from classifier modules, to the extent available.

The perceptual model 806 is a module that takes the audio segment, and parameters of it from the classifiers, and computes a masking envelope that is adapted to the watermark type, protocol and insertion method. See U.S. Patent App. Pub. No. 2014/0108020 and U.S. Pat. No. 9,305,559 for more examples of watermark types, protocols, insertion methods, and corresponding perceptual models that apply to them.

The embedder uses the watermark type and protocol to transform the message into a watermark signal for insertion into the host audio segment. The DWM signal constructor module 804 performs this transformation of a message. The message may include a fixed and variable portion, as well as error detection portion generated from the variable portion. It may include an explicit synchronization component, or synchronization may be obtained through other aspects of the watermark signal pattern or inherent features of the audio, such as an anchor point or event, which provides a reference for synchronization. As detailed further below, the message is error correction encoded, repeated, and spread over a carrier. We have used convolutional coding, with tail biting codes, ⅓ rate to construct an error correction coded signal. This signal uses binary antipodal signaling, and each binary antipodal element is spread spectrum modulated over a corresponding m-sequence carrier. The parameters of these operations depend on the watermark type and protocol. For example, frequency domain and time domain watermarks use some techniques in common, but the repetition and mapping to time and frequency domain locations, is of course, different. The resulting watermark signal elements are mapped (e.g., according to a scattering function, and/or differential encoding configuration) to corresponding host signal elements based on the watermark type and protocol. Time domain watermark elements are each mapped to a region of time domain samples, to which a shaped bump modification is applied.

The perceptual adaptation module 808 is a function that transforms the watermark signal elements to changes to corresponding features of the host audio segment according to the perceptual masking envelope. The envelope specifies limits on a change in terms of magnitude, time and frequency dimensions. Perceptual adaptation takes into account these limits, the value of the watermark element, and host feature values to compute a detail gain factor that adjust watermark signal strength for a watermark signal element (e.g., a bump) while staying within the envelope. A global gain factor may also be used to scale the energy up or down, e.g., depending on feedback from iterative embedding, or user adjustable watermark settings.

Insertion function 810 makes the changes to embed a watermark signal element determined by perceptual adaptation. These can be a combination of changes in multiple domains (e.g., time and frequency). Equivalent changes from one domain can be transformed to another domain, where they are combined and applied to the host signal. An example is where parameters for frequency domain based feature masking are computed in the frequency domain and converted to the time domain for application of additional temporal masking (e.g., removal of pre-echoes) and insertion of a time domain change.

Iterative embedding control module 812 is a function that implements the evaluations that control whether iterative embedding is applied, and if so, with which parameters being updated. This is not applied for low latency or real-time embedding, but may be useful for embedding of pre-recorded content.

Processing of these modules repeats with the next audio block. The same watermark may be repeated (e.g., tiled), may be time multiplexed with other watermarks, and have a mix of redundant and time varying elements.

Detection

Figure 12:
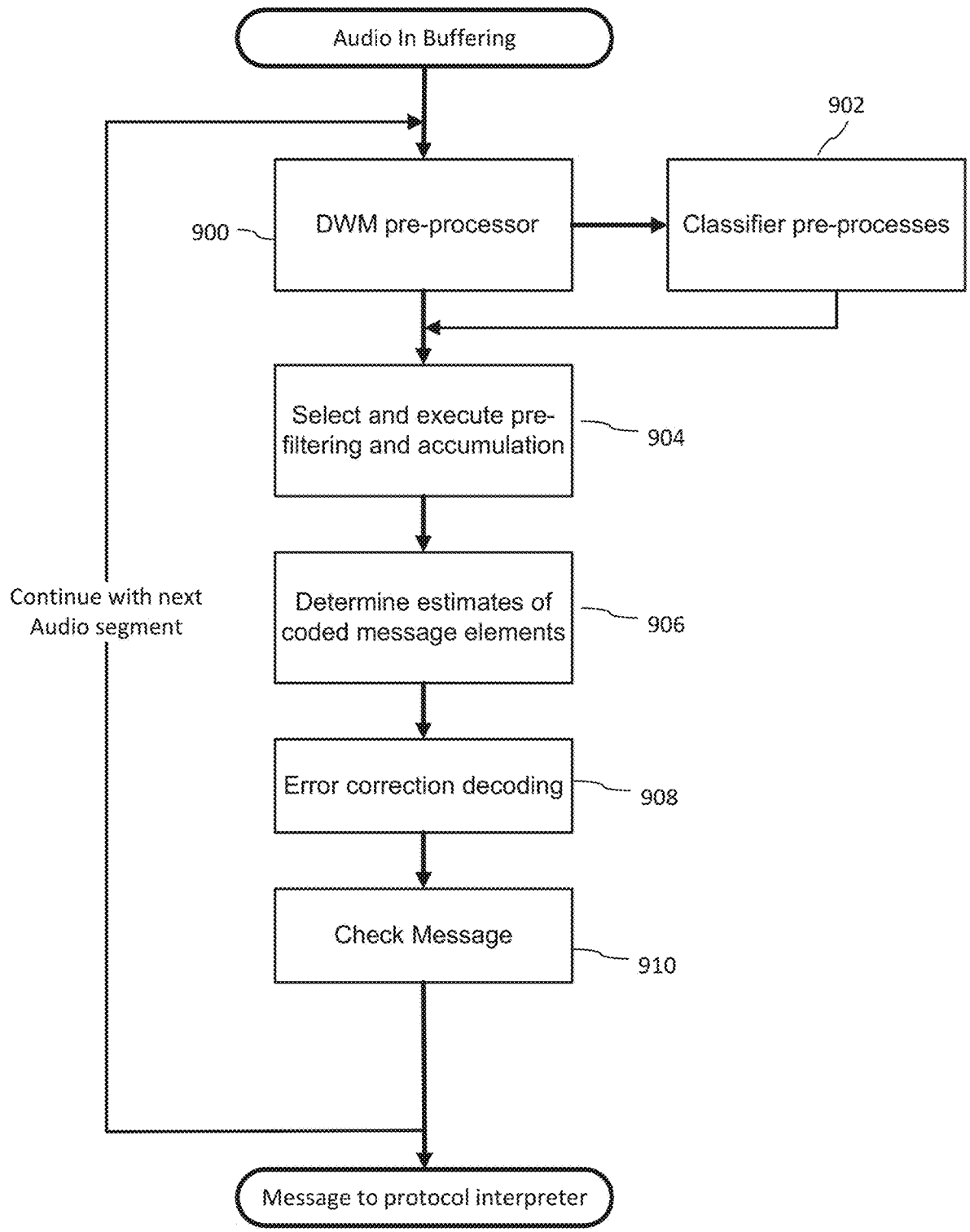
FIG. 12 is a diagram illustrating a watermark detecting process.

FIG. 12 is flow diagram illustrating a process for decoding auxiliary data from audio. We have used the terms "detect" and "detector" to refer generally to the act and device, respectively, for detecting an embedded watermark in a host signal. The device is either a programmed computer, or special purpose digital logic, or a combination of both. Acts of detecting encompass determining presence of an embedded signal or signals, as well as ascertaining information about that embedded signal, such as its position and time scale (e.g., referred to as "synchronization"), and the auxiliary information that it conveys, such as variable message symbols, fixed symbols, etc. Detecting a watermark signal or a component of a signal that conveys auxiliary information is a method of extracting information conveyed by the watermark signal. The act of watermark decoding also refers to a process of extracting information conveyed in a watermark signal. As such, watermark decoding and detecting are sometimes used interchangeably. In the following discussion, we provide additional detail of various stages of obtaining a watermark from a watermarked host signal.

FIG. 12 illustrates stages of a multi-stage watermark detector. This detector configuration is designed to be sufficiently general and modular so that it can detect different watermark types. There is some initial processing to prepare the audio for detecting these different watermarks, and for efficiently identifying which, if any, watermarks are present. For the sake of illustration, we describe an implementation that detects both time domain and frequency domain watermarks (including peak based and distributed bumps), each having variable protocols. From this general implementation framework, a variety of detector implementations can be made, including ones that are limited in watermark type, and those that support multiple types.

The detector operates on an incoming audio signal, which is digitally sampled and buffered in a memory device. Its basic mode is to apply a set of processing stages to each of several time segments (possibly overlapping by some time delay). The stages are configured to re-use operations and avoid unnecessary processing, where possible (e.g., exit detection where watermark is not initially detected or skip a stage where execution of the stage for a previous segment can be re-used).

As shown in FIG. 12, the detector starts by executing a preprocessor 900 on digital audio data stored in a buffer. The preprocessor samples the audio data to the time resolution used by subsequent stages of the detector. It also spawns execution of initial pre-processing modules 902 to classify the audio and determine watermark type.

This pre-processing has utility independent of any subsequent content identification or recognition step (watermark detecting, fingerprint extraction, etc.) in that it also defines the audio context for various applications. For example, the audio classifier detects audio characteristics associated with a particular environment of the user, such as characteristics indicating a relatively noise free environment, or noisy environments with identifiable noise features, like car noise, or noises typical in public places, city streets, etc. These characteristics are mapped by the classifier to a contextual statement that predicts the environment.

Examples of these pre-processing threads include a classifier to determine audio features that correspond to particular watermark types. Pre-processing for watermark detection and classifying content share common operations, like computing the audio spectrum for overlapping blocks of audio content. Similar analyses as employed in the embedder provide signal characteristics in the time and frequency domains such as signal energy, spectral characteristics, statistical features, tonal properties and harmonics that predict watermark type (e.g., which time or frequency domain watermark arrangement). Even if they do not provide a means to predict watermark type, these pre-processing stages transform the audio blocks to a state for further watermark detection.

As explained in the context of embedding, perceptual modeling and audio classifying processes also share operations. The process of applying an auditory system model to the audio signal extracts its perceptual attributes, which includes its masking parameters. At the detector, a compatible version of the ear model indicates the corresponding attributes of the received signal, which informs the type of watermark applied and/or the features of the signal where watermark signal energy is likely to be greater. The type of watermark may be predicted based on a known mapping between perceptual attributes and watermark type. The perceptual masking model for that watermark type is also predicted. From this prediction, the detector adapts detector operations by weighting attributes expected to have greater signal energy with greater weight.

Audio fingerprint recognition can also be triggered to seek a general classification of audio type or particular identification of the content that can be used to assist in watermark decoding. Fingerprints computed for the frame are matched with a database of reference fingerprints to find a match. The matching entry is linked to data about the audio signal in a metadata database. The detector retrieves pertinent data about the audio segment, such as its audio signal attributes (audio classification), and even particular masking attributes and/or an original version of the audio segment if positive matching can be found, from metadata database. See, for example, U.S. Patent Publication 20100322469 (by Sharma, entitled Combined Watermarking and Fingerprinting).

An alternative to using classifiers to predict watermark type is to use simplified watermark detector to detect the protocol conveyed in a watermark as described previously. Another alternative is to spawn separate watermark detection threads in parallel or in predetermined sequence to detect watermarks of different type. A resource management kernel can be used to limit un-necessary processing, once a watermark protocol is identified.

The subsequent processing modules of the detector shown in FIG. 12 represent functions that are generally present for each watermark type. Of course, certain types of operations need not be included for all applications, or for each configuration of the detector initiated by the pre-processor. For example, simplified versions of the detector processing modules may be used where there are fewer robustness concerns, or to do initial watermark synchronization or protocol identification. Conversely, techniques used to enhance detection by countering distortions in ambient detection (multipath mitigation) and by enhancing synchronization in the presence of time shifts and time scale distortions (e.g., linear and pitch invariant time scaling of the audio after embedding) are included where necessary.

The detector for each watermark type applies one or more pre-filters and signal accumulation functions that are tuned for that watermark type. Both of these operations are designed to improve the watermark signal to noise ratio. Pre-filters emphasize the watermark signal and/or de-emphasize the remainder of the signal. Accumulation takes advantage of redundancy of the watermark signal by combining like watermark signal elements at distinct embedding locations. As the remainder of the signal is not similarly correlated, this accumulation enhances the watermark signal elements while reducing the non-watermark residual signal component. For reverse frame embedding, this form of watermark signal gain is achieved relative to the host signal by taking advantage of the reverse polarity of the watermark signal elements. For example, 20 frames are combined, with the sign of the frames reversing consistent with the reversing polarity of the watermark in adjacent frames.

The output of this configuration of filter and accumulator stages provides estimates of the watermark signal elements at corresponding embedding locations, or values from which the watermark signal can be further detected. At this level of detecting, the estimates are determined based on the insertion function for the watermark type. For insertion functions that make bump adjustments, the bump adjustments relative to neighboring signal values or corresponding pairs of bump adjustments (for pairwise protocols) are determined by predicting the bump adjustment (which can be a predictive filter, for example). For peak based structures, pre-filtering enhances the peaks, allowing subsequent stages to detect arrangements of peaks in the filtered output. Pre-filtering can also restrict the contribution of each peak so that spurious peaks do not adversely affect the detection outcome. For quantized feature embedding, the quantization level is determined for features at embedding locations. For echo insertion, the echo property is detected for each echo (e.g., an echo protocol may have multiple echoes inserted at different frequency bands and time locations). In addition, pre-filtering provides normalization to audio dynamic range (volume) changes.

The embedding locations for coded message elements are known based on the mapping specified in the watermark protocol. In the case where the watermark signal communicates the protocol, the detector is programmed to detect the watermark signal component conveying the protocol based on a predetermined watermark structure and mapping of that component. For example, an embedded code signal (e.g., Hadamard code explained previously) is detected that identifies the protocol, or a protocol portion of the extensible watermark payload is decoded quickly to ascertain the protocol encoded in its payload.

Returning to FIG. 12, the next step of the detector is to aggregate estimates of the watermark signal elements. This process is, of course, also dependent on watermark type and mapping. For a watermark structure comprised of peaks, this includes determining and summing the signal energy at expected peak locations in the filtered and accumulated output of the previous stage. For a watermark structure comprised of bumps, this includes aggregating the bump estimates at the bump locations based on a code symbol mapping to embedding locations. In both cases, the estimates of watermark signal elements are aggregated across embedding locations.

In our time domain Direct Sequence Spread Spectrum (DSSS) implementation, this detection process can be implemented as a correlation with the carrier signal (e.g., m-sequences) after the pre-processing stages. The pre-processing stages apply a pre-filtering to an approximately 9 second audio frame and accumulate redundant watermark tiles by averaging the filter output of the tiles within that audio frame. Non-linear filtering (e.g., extended dual axis or differentiation followed by quad axis) produces estimates of bumps at bump locations within an accumulated tile. The output of the filtering and accumulation stage provides estimates of the watermark signal elements at the chip level (e.g., the weighted estimate and polarity of binary antipodal signal elements provides input for soft decision, Viterbi decoding). These chip estimates are aggregated per error correction encoded symbol to give a weighted estimate of that symbol. Robustness to translational shifts is improved by correlating with all cyclical shift states of the m-sequence. For example, if the m-sequence is 31 bits, there are 31 cyclical shifts. For each error correction encoded message element, this provides an estimate of that element (e.g., a weighted estimate).

In the counterpart frequency domain DSSS implementation, the detector likewise aggregates the chips for each error correction encoded message element from the bump locations in the frequency domain. The bumps are in the frequency magnitude, which provides robustness to translation shifts.

Next, for these implementations, the weighted estimates of each error correction coded message element are input to a convolutional decoding process. This decoding process is a Viterbi decoder. It produces error corrected message symbols of the watermark message payload. A portion of the payload carries error detection bits, which are a function of other message payload bits.

To check the validity of the payload, the error detection function is computed from the message payload bits and compared to the error detection bits. If they match, the message is deemed valid. In some implementations, the error detection function is a CRC. Other functions may also serve a similar error detection function, such as a hash of other payload bits.

Example Workflows

Having described the numerous embodiments above, an exemplary implementation of an embedding process, based on the above-described embodiments, will now be described with reference to FIG. 13. Similarly, an exemplary implementation of a reading process, based on the above-described embodiments, is described with reference to FIG. 14.

Figure 13:
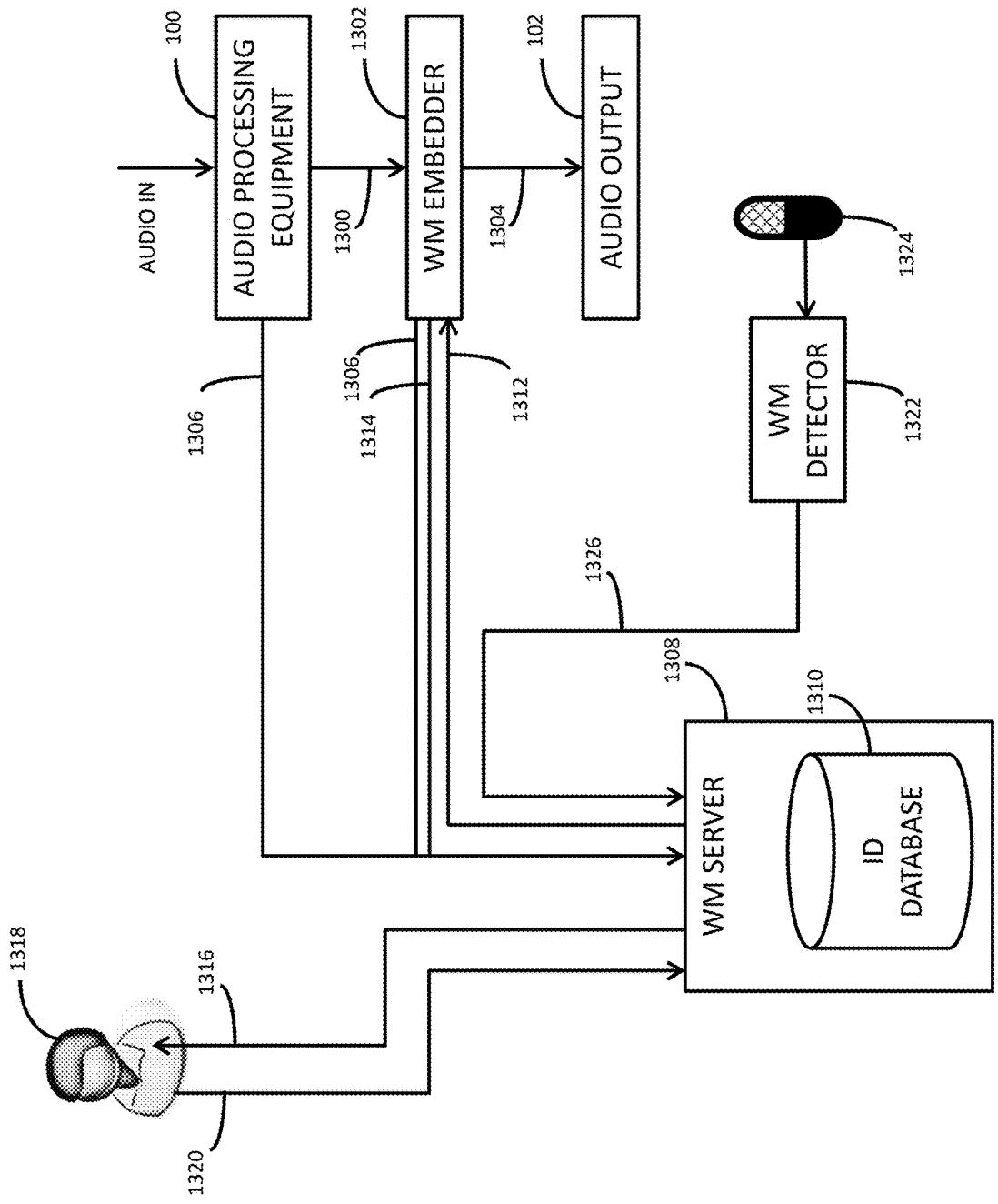
FIG. 13 is flow diagram illustrating an exemplary content processing workflow that facilitates watermark embedding and correlation of content and metadata associated with events.

Referring to FIG. 13, audio or audiovisual (AV) content 1300 is produced by audio processing system 100, as described above. A digital watermark embedder (labelled here as "WM EMBEDDER" at 1302) embeds identifying information (e.g., including a watermark ID, etc.) into the produced content 1300 via a digital watermark embedding process, as described above, thereby producing watermarked content 1304. Although the embedder 1302 is illustrated here as separate from the audio processing system 100, it will be appreciated that the embedder 1302 may be configured in any suitable manner, including the configurations exemplarily described with respect to any of FIGS. 2 to 9. The watermarked content 1304 is then output (e.g., to audience members attending an event) via the aforementioned audio output system 102.

Identifying information to embed into the produced content 1300 may be obtained in a variety of ways. In one example, the audio processing system 100 and/or the embedder 1302 may be pre-loaded with one or more watermark IDs. In another example, the audio processing system 100 or the embedder 1302 can generate a request 1306 to be transmitted to the watermark server (labelled here as "WM SERVER" at 1308). The request 1306 can be generated automatically (e.g., every time a track of produced content 1300 changes, every time an artist associated with the produced content 1300 changes, every time a theatrical act or scene changes, after a user-determined or default period of time has elapsed, etc.), manually (e.g., by AV/Sound/Lighting engineer, DJ, studio engineer, etc., associated with the produced content 1300), or the like any combination thereof.

The request 1306 can include a query for one watermark ID or for multiple watermark IDs. The request 1306 can also include information describing the type of watermark ID desired (e.g., a constant watermark ID, a continuously- or periodically-incrementing time-stamp watermark ID, etc.), the desired signal strength at which the identifying information is to be embedded into the produced content 1300, the desired spectral profile with which the identifying information is to be embedded into the produced content 1300, etc., or any other desired or suitable metadata to be embedded into the produced content 1300 or otherwise associated with the identifying information as explained previously. It will be appreciated, however, that the metadata to be embedded into the produced content 1300 (or otherwise associated with the identifying information) can be provided separately from the request 1306. In such case, communications from the audio processing system 100 or embedder 1302 can be appended with a system identifier (e.g., an ID number unique to the audio processing system 100 or embedder 1302) that facilitates matching of requests 1306 with information contained in other communications at the watermark server 1308.

The watermark server 1308 may, for example, manage operations associated with the watermark ID database (labelled here as "ID DATABASE" at 1310). Information contained within the transmitted request 1306, or any other communication from the audio processing system 100 or embedder 1302 is stored in the watermark ID database 1310. Upon receiving the request 1306, the watermark server 1308 generates and transmits a response 1312 to the embedder 1302, which includes the requested identifying information (e.g., including one or more watermark IDs), along with any requested metadata or instructions (e.g., to cause the embedder 1302 to embed a constant watermark ID, an incrementing watermark ID, etc., at a particular signal strength or within a particular signal strength range, at a particular spectral profile or within a particular spectral profile range, etc.). The watermark server 1308 also associates, within the watermark ID database 1310, the generated watermark ID(s) with any other information transmitted by the audio processing system 100 or embedder 1302 (e.g., to facilitate the correlation of produced content 1300 and metadata associated with events, artists, tracks, venues, locations, DJs, date and times, etc., to facilitate tracking of downloads, views, etc., of the produced content from content hosting services, to facilitate sharing of produced content via social networks, to facilitate the maintenance/generation of extended social network(s) encompassing relationships among artists, DJs, producers, content venue owners, distributors, event coordinators/promoters, etc., to facilitate the data-mining of such extended social networks, etc.).

Upon receiving the response 1312, the embedder 1302 embeds one or more items of identifying information and any other relevant or desired information (either contained in the response 1312 or otherwise obtained from any suitable user interface) into the produced content 1300, thereby creating watermarked content 1304. In one embodiment, the embedder 1302 may transmit an acknowledgement 1314 (e.g., containing the watermark ID(s) in the response 1312, metadata in the request 1306, the system identifier, a job ID, etc.) to the watermark server 1308, indicating that the response 1312 was successfully received. In one embodiment, the embedder 1302 transmits an acknowledgement 1314 whenever one or more watermark IDs are embedded (as may be applicable in cases where watermark IDs were requested and queued pending use). In another embodiment, the acknowledgement 1314 can also indicate the actual time, date and/or duration over which each watermark ID was inserted into the produced content 1300, in addition to any other metadata gathered at time of use by the embedder 1302 (e.g., including any information entered by a DJ relating to the mix/track being played, etc.).

After the response 1312 is transmitted (e.g., after the acknowledgement 1314 is received by the watermark server 1308, after the event is over, etc.), the watermark server 1308 can transmit a message 1316 to one or more different parties, such as party 1318 (e.g., an artist, DJ, producer, originator, venue owner, distributor, event coordinator/promoter, etc.), associated with the event, the venue, the produced content 1300, etc. The message 1316 may be transmitted to the party 1318 via email, text message, tweet, phone, push notification, posting to social network page, etc., via any suitable computer or telecommunications network. The message 1316 can include any information received at, or sent from, the watermark server 1308 during, or otherwise in connection with, the event (or, alternatively, may include one or more links to such information). As will be discussed in greater detail below, a message 1316 may also be transmitted upon uploading of captured watermarked content. The message 1316 may further include a web link, access code, etc., enabling the party to post metadata 1320 (e.g., related to the event) to the watermark server 1308, to a content hosting system 106, to a social networking system 108, etc. The watermark server 1308 then associates, within the watermark ID database 1310, the posted metadata 1320 with the watermark ID(s) generated in connection with the event (e.g., to facilitate the subsequent correlation of produced content 1300 and metadata associated with events, artists, tracks, venues, locations, DJs, dates, times, etc., to facilitate tracking of downloads, views, etc., of the produced content from content hosting services, to facilitate sharing of produced content via social networks, to facilitate the maintenance/generation of extended social network(s) encompassing relationships among artists, DJs, producers, audience members, fans/enthusiasts of the content, venue owners, distributors, event coordinators/promoters, etc., to facilitate the data-mining of such extended social networks, etc.).

Referring still to FIG. 13, a watermark detector 1322 may optionally be provided to detect the presence of a watermark in watermarked content 1304. In one embodiment, the watermark detector 1322 may additionally be configured to read a watermark embedded in watermarked content 1304. To facilitate watermark detection and/or reading, one or more microphones (e.g., microphone 1324) may be provided to capture audio content output by the audio output system 102 and generate one or more corresponding captured audio signals.

The watermark detector 1322 can process the captured audio signals generated by the microphone 1324 to implement a watermark detection process such as that described above with respect to FIG. 12. If the watermark detection process indicates the presence of a watermark, the watermark detector 1322 can further process the captured audio signal(s) to extract the identifying information embedded within the watermarked content 1304 and transmit the extracted identifying information (e.g., in a confirmation report 1326) to the watermark server 1308. In such a case, the report 1326 can indicate the identifying information that was embedded within the watermarked content 1304, the date/time at which the identifying information that was extracted, the location where the identifying information extracted, etc. The watermark server 1308 can append a corresponding record stored in the watermark ID database 1310 with the information contained in reports 1326 received from the watermark detector 1322.

In one embodiment, the watermark detector 1322 can process the captured audio signals to determine one or more characteristics (e.g., watermark signal strength) of any watermark embedded within the captured audio content. Once determined, the characteristics can be transmitted (e.g., in a report 1326) to the watermark server 1308, stored in the watermark ID database 1310 (e.g., as described above), and used to create a log of actual watermark signal strength. The log could then be accessed by the watermark server 1308 to generate instructions that can be implemented at the watermark embedder to fine-tune the watermark signal strength in subsequently-generated watermarked content 1304.

In another embodiment (and although not illustrated), the watermark detector 1322 may be coupled to an input of the watermark embedder 1302 and be configured to receive the produced content 1300 and process the produced content 1300 to determine whether the produced content 1300 contains any pre-embedded watermarks. If any pre-embedded watermarks are detected, the detector 1322 may transmit an alert to the watermark embedder 1302 (e.g., indicating the presence of a pre-embedded watermark, indicating the type of watermark that was pre-embedded—e.g., time-domain, frequency-domain, etc., indicating the presence of any pre-embedded identifying information, synchronization information, embedding policy information, etc., or the like or any combination thereof). Based on the indication(s) provided by the alert, the watermark embedder 1302 can adjust or otherwise adapt the process by which information is embedded into the produced content 1300 using any suitable or desired technique to create the watermarked content 1304 in a manner that ensures sufficiently reliable detection and/or reading of information embedded within the watermarked content 1304, in a manner that minimizes or otherwise reduces the perceptibility of the embedded watermark, in a manner that is in accordance with any embedding policy information indicated by the alert, or the like or any combination thereof.

Upon detecting a pre-embedded watermark, the embedder 1302 can, optionally, transmit a request 1306 to the watermark server 1308 (e.g., containing information indicating the presence of a pre-embedded watermark in the produced content 1300, indicating the type of watermark that was pre-embedded, indicating the presence of any pre-embedded identifying information, synchronization information, embedding policy information, etc., or the like or any combination thereof). Responsive to the request 1306, the watermark server 1308 can generate and transmit a response 1312 to the embedder 1302 that includes, among other things, instructions (e.g., to cause the embedder 1302 to embed information in a manner that ensures sufficiently reliable detection and/or reading of information embedded within the watermarked content 1304, in a manner that minimizes or otherwise reduces the perceptibility of the embedded watermark, in a manner that is in accordance with any embedding policy information indicated by the alert, or the like or any combination thereof). Optionally, information contained in this request 1306 can be stored in the ID database 1310 (e.g., in association with information that was (or was to be) embedded into the produced content 1300 before the alert was received). Information associated with the pre-embedded watermark can be stored within the ID database 1310 and, in such an embodiment, information that was (or was to be) embedded into the produced content 1300 before the alert was received can be stored in the ID database 1310 (e.g., in association with the pre-embedded watermark).

Figure 14:
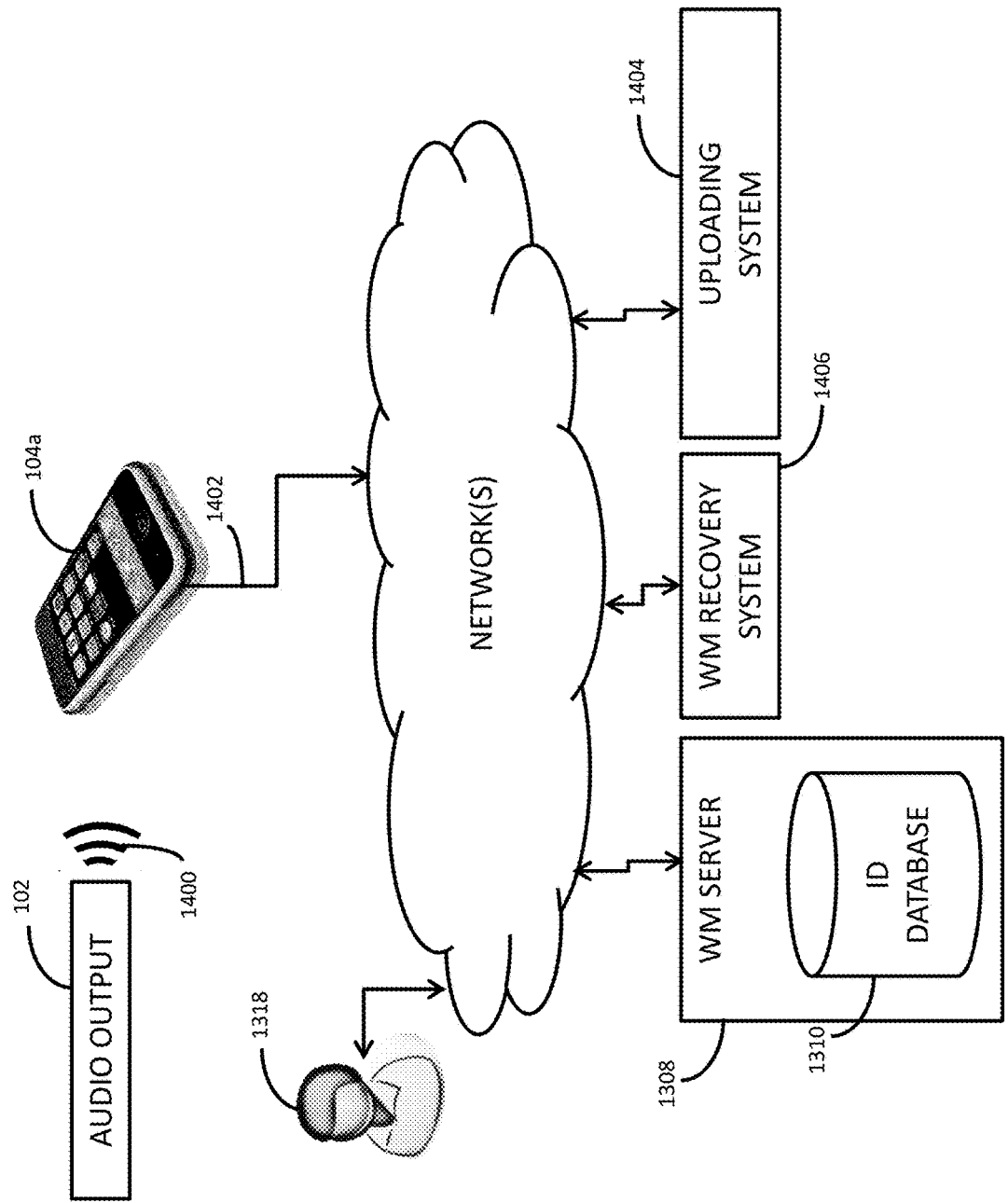
FIG. 14 is flow diagram illustrating an exemplary content processing workflow that facilitates watermark reading and correlation of content and metadata associated with events.

Referring to FIG. 14, audio or audiovisual (AV) content 1400 is captured by a device such as the aforementioned mobile device 104a, as described above with respect to FIG. 1. In this exemplary workflow, the captured content 1400 includes watermarked content (e.g., the watermarked content 1304 discussed above). The captured content 1400 is then transferred, uploaded or posted (1402) from the mobile device 104a to one or more uploading systems 1404 (e.g., a content hosting system 106, a cloud storage system 107, a social networking system 108, or the like, or any combination thereof). The uploaded content 1402 may be accompanied by one or more items of upload metadata, which may be collected by the uploading system 1404.

Information (e.g., identifying information) may then be extracted or otherwise recovered from the uploaded content 1402. In one example, the uploading system 1404 can transmit a link to the uploaded content 1402 (or transmit a computer file in which the uploaded content 1402 is stored) to a watermark recovery system 1406, where a process to extract or otherwise recover information (e.g., including a watermark ID, a timestamp, etc.) from the uploaded content 1402 can be executed (e.g., as discussed above). In another example, the uploading system 1404 can record a pointer to the uploaded content 1402 and transmit the pointer to the recovery system 1406, which then fetches the uploaded content 1402 using the pointer and executes a process to extract or otherwise recover information from the uploaded content 1402. Any extracted or recovered information can optionally be written back to a database associated with the uploading system 1404, or to a database associated with another system (e.g., where it can be accessed by the uploading system 1404, or by one or more other systems that access the uploaded content 1402). Thereafter, by reference to the extracted or recovered information, the uploading system 1404 can perform one or more correlation processes and/or data aggregation processes, e.g., as described above. Optionally, the uploading system 1404 can associate the extracted or recovered information with any suitable or desired upload metadata accompanying the uploaded content 1402. Generally, the recovery system 1406 and the uploading system 1404 are communicatively coupled to one another via one or more wired or wireless networks such as a WiFi network, a Bluetooth network, a Bluetooth Low Energy network, a cellular network, an Ethernet network, an intranet, an extranet, the Internet, or the like or any combination thereof.

Although the extraction or recovery process is described here as being executed completely at the recovery system 1406, it will be appreciated that the extraction or recovery process may be at least partially executed locally (e.g., at the mobile device 104a). In the event that the extraction or recovery process is at least partially executed locally, any extracted or recovered information can be appended to the captured content 1400, and the appended captured content may then be transmitted (i.e., as the uploaded content 1402), to the uploading system 1404. The appended information can then be made accessible to the recovery system 1406 for use in extracting or otherwise recovering the embedded information. Optionally, one or more items of information (e.g., watermark ID, timestamp, etc.) extracted as a result of a locally-executed recovery process can be transmitted (e.g., from the mobile device 104a) to the watermark server 1308, where they can be stored in the ID database 1310 and/or or be used (e.g., by the watermark server 1308) to query the watermark ID database 1310 to find one or more items of the aforementioned metadata associated with the transmitted item(s) of recovered information. The found item(s) of metadata can be transmitted (e.g., from the watermark server 1308) to the mobile device 104a, or one or more pointers or links to the found item(s) of metadata can be transmitted to the mobile device 104a. Generally, the watermark server 1308 and the mobile device 104a can be communicatively coupled to one another via one or more wired or wireless networks such as a WiFi network, a Bluetooth network, a Bluetooth Low Energy network, a cellular network, an Ethernet network, an intranet, an extranet, the Internet, or the like or any combination thereof. The found item(s) of metadata (or links thereto) received at the mobile device 104a can thereafter be appended to the captured content 1400, and the appended captured content may then be transmitted (e.g., as the uploaded content 1402) to the uploading system 1404. Alternatively, the found item(s) of metadata may be transmitted to the uploading system 1404 in conjunction with the uploaded content 1402.

The uploaded content 1402 can optionally be subjected to one or more pre-processing steps (e.g., at the uploading system 1404 and/or at the recovery system 1406) before the information is recovered. For example, the uploaded content 1402 may be transcoded to another format with a tool such as FFmpeg, and the audio component may be extracted from the uploaded content 1402 before recovering the identifying information. Format conversion may take place before the uploaded content 1402 is stored (e.g., within a database associated with the uploading system 1404), thus the recovery may operate on a format-converted copy of the original uploaded content 1402. Alternatively, the raw uploaded content data may be examined by the recovery process immediately as it is uploaded.

One or more items of information (e.g., watermark ID, timestamp, etc.) extracted or otherwise recovered from the uploaded content are transmitted (e.g., from the recovery system 1406) to the watermark server 1308, where they can be stored in the ID database 1310 and/or be used (e.g., by the watermark server 1308) to query the watermark ID database 1310 to find one or more items of the aforementioned metadata associated with the transmitted item(s) of recovered information. Found items of metadata can be transmitted (e.g., from the watermark server 1308) to the recovery system 1406, or one or more pointers or links to the found item(s) of metadata can be transmitted to the recovery system 1406 (e.g., to facilitate access to the found item(s) of metadata by the recovery system 1406). Generally, the watermark server 1308 and the recovery system 1406 can be communicatively coupled to one another via one or more wired or wireless networks such as a WiFi network, a Bluetooth network, a Bluetooth Low Energy network, a cellular network, an Ethernet network, an intranet, an extranet, the Internet, or the like or any combination thereof.

The recovery system 1406 can transmit the found item(s) of metadata (or links thereto) to the uploading system 1404, which the uploading system 1404 can associate with the uploaded content 1402. Thereafter, by reference to the found item(s) of metadata (or links thereto), the uploading system 1404 can perform one or more correlation processes and/or data aggregation processes, e.g., as described above. Optionally, the uploading system 1404 can associate the found item(s) of metadata with any suitable or desired upload metadata accompanying the uploaded content 1402.

The recovery system 1406 can also generate an identifier associated with one or more items of the recovered information and the found item(s) of metadata. For example, the identifier can be generated by combining (e.g., hashing) one or more items of the recovered information and the found item(s) to create a globally-unique identifier (GUID). The recovery system 1406 can then transmit the generated identifier to the uploading system 1404 (e.g., in association with any of the recovered or aggregated information, or any link to the found item(s) of metadata). Alternatively, the uploading system 1404 may generate the identifier as discussed above. Optionally, the uploading system 1404 can associate the identifier with any suitable or desired upload metadata accompanying the uploaded content 1402.

Upon receiving or generating the identifier, the uploading system 1404 can instantiate the identifier (or any upload metadata, or recovered information or found item(s) of metadata (or any link thereto), associated with the identifier, etc.) as a tag (e.g., a searchable tag) associated with the uploaded content 1402, as a link to other uploaded content or information associated with any of the recovered information or found item(s) of metadata (or any link thereto), or the like or any combination thereof. The uploading system 1404 may also collect information (e.g., other than the upload metadata) that is associated with the uploaded content 1402, such as posted links to the uploaded content 1402, posted links to content or information other than the uploaded content 1402, user names or IDs of system users who watch, listen, play or view the uploaded content 1402, user names or IDs of system users who post a comment on (or link to) the uploaded content 1402 or otherwise share the uploaded content 1402, or the like or any combination thereof. Such collected information may also be associated with (e.g., either directly or indirectly) the aforementioned identifier (e.g., the GUID).

Optionally, the GUID can be transmitted to the watermark server 1308 (e.g., by the recovery system 1406 or the uploading system 1404), where it can be associated, within the ID database 1310, with one or more items of the recovered information. In such an embodiment, any information or metadata associated with the GUID can be transmitted back to the watermark server 1308 and stored, as metadata, in the watermark ID database 1310 (e.g., in association with one or more items of the recovered information).

In one embodiment, the found item(s) of metadata (or link(s) thereto) includes one or more items of the aforementioned content policy information. Accordingly, by reference to the content policy information, the uploading system 1404 can tailor the manner in which the uploaded content is processed, formatted, tracked, made available for viewing, sharing, etc., associated with advertisements and other information, or the like or any combination thereof.

In another embodiment, the found item(s) of metadata (or link(s) thereto) includes one or more items of the aforementioned metadata update information. Accordingly, by reference to the period of time or date specified in the included metadata update information, the uploading system 1404 can transmit the metadata update information to the watermark server 1308 to query the ID database 1310 and find one or more items of the provided, revised or otherwise updated metadata indicated by the metadata update information. In one embodiment, the watermark server 1308 can transmit a message (e.g., the aforementioned message 1316 described above with respect to FIG. 13) to one or more different parties, such as party 1318 (e.g., an artist, DJ, producer, originator, venue owner, distributor, event coordinator/promoter, user, etc.), associated with the event, the venue, the captured content 1400, the uploaded content 1402, etc. In this embodiment, the message can be transmitted upon receiving the recovered information or the GUID from the recovery system 1406, upon receiving any collected information from the uploading system 1404, or the like or any combination thereof. In this embodiment, the message can include any information received at, or sent from, the watermark server 1308 during, or otherwise in connection with, the event the captured content 1400, the uploaded content 1402, or the like or any combination thereof (or, alternatively, may include one or more links to such information).

By transmitting messages as discussed above, patterns, trends, etc. (e.g., in terms of views, comments posted, number of times shared, websites where shared, etc.) associated with instances of uploaded content (e.g., including the identification of other content associated with the uploaded content—e.g., by reference to metadata commonly associated with the other content and the uploaded content, as well as including the identification of other content associated with the same identifying information associated with the uploaded content, etc.) can be discovered. Information relating to views, comments posted, re-sharing of content can be counted as an aggregate, or statistically analyzed in greater depth for any suitable or desired purpose. For example, currently it's hard for an event organizer to garner their following on YouTube based on views of their uploaded post-event media. Audience uploads for the same event (or for related or associated events) are hard to aggregate together due to inconsistencies in labelling or inability to identify those uploads. Identification through watermark recovery fulfills that grouping and enables a broader and more representative picture of viewer interest to be determined.

ADDITIONAL REMARKS

While the embodiments detailed above contemplated processes for managing and sharing uploaded content, it will be appreciated that the processes may also be applied to enable user discovery of metadata associated with information extracted from captured or uploaded content. For example, information (e.g., identifying information, synchronization information, etc.) extracted from captured or uploaded content can be used (e.g., by the device that captured the content, or that otherwise has access to the captured or uploaded content) to query a system such as the watermark server 1308 to find one or more items of the metadata (or other captured or uploaded content) associated with the extracted information. The found metadata (or other captured or uploaded content) can then be transmitted to (or otherwise be made accessible to) the device that captured or accessed the content on which the query was based (e.g., for rendering—via imagery, sound, haptic cues, etc.—to a user of the device).

Further, while the embodiments detailed above contemplated processes for processing, managing and sharing (and for discovering metadata relating to) content captured by a user's mobile device present at an event such as a concert, a show, a party, etc., it will be appreciated that the technology is not so limited. For example, any of the processes described herein may be applied to content captured by a user's mobile device at any suitable or desired time, at any suitable or desired place (e.g., when the user is shopping for groceries, when the user is walking down the street, through an airport, a mall, etc.).

While the embodiments detailed above contemplated processes for managing posts based on information extracted from an AV signal, it will be appreciated that posts may be managed based on information extracted from signals such as audio signals, video signals, speech, images, surface textures of objects, textual documents, or the like or any combination thereof. The capture of such other signals can be done using, as appropriate, one or more microphones, cameras, etc., associated with a smartphone as provided by its mobile operating system, and/or a mobile application program. The captured signals can be analyzed (over a period of time, if necessary) to extract or otherwise discern information (e.g., identifying information) therefrom. As before, the process of extracting information from such other signals may include extracting digital watermark data, content fingerprint extraction and matching, or the like or any combination thereof.

Further, auxiliary data signals may be encoded within motion imparted to an object. For example, in a simulator ride (i.e., a type of amusement park or fairground ride, in which a platform on which a patron is seated is moved above by a set of computer-controlled hydraulic legs), subtle motions, tilts or vibrations can be added, as an auxiliary data signal, to the larger-scale platform motion. Such motion can be captured (e.g., using one or more single- or multi-axis accelerometers, magnetometers, gyroscopes, tilt-sensors, etc., associated with the patron's smartphone) and corresponding motion signals generated by the smartphone can be processed to recover the auxiliary data signal using methods similar to those discussed above. Auxiliary data signals could similarly be encoded within (and extracted from) motion imparted to a building (e.g., from one or more architectural systems which move/modulate a building's position), or an active vehicle suspension system (e.g., as may be found in the Porshe Cayenne sport utility vehicle).

In another example, movable baffles can be provided to reflect sound within a room, or allow sound to escape through windows. In such an example, motion of acoustic baffles can alter the reverberant characteristics of the room dynamically, not just for a set event/audience/seating configuration. Acoustic sculptures (e.g., when used as a baffle), can also be rotated/modulated to apply a notch into the audio spectrum by absorbing/reflecting specific frequency bands (which may too be modulated). Reflecting crowd-noise around the room based on an encoded pattern to carry a subliminal identification mark (i.e. consider the reflected crowd noise as a signal source). When captured, say in a video recording, the measure of noise signal strength, absolute, or relative to other signals, over time can constitute an auxiliary data signal. Thus, a motion-based auxiliary data signal may thus include extracting digital watermark data, or may include motion-based fingerprint extraction and matching.

Auxiliary data signals may also be encoded as changes in room or building temperature or pressure (e.g., by modulating HVAC blower/baffle settings). The capture of such other signals can be done using, as appropriate, one or more temperature sensors, moisture sensors, pressure sensors, etc., associated with a smartphone as provided by its mobile operating system, and/or a mobile application program. Signals generated by such sensors can be analyzed (e.g., over a sufficient period of time) to discern an auxiliary data signal therefrom. Temperature/pressure-based auxiliary data signals may thus include extracting digital watermark data, or may include temperature/pressure profile fingerprint extraction and matching. Similarly, while the embodiments detailed above contemplated processes for embedding auxiliary data into audio, it will be appreciated that auxiliary data may be embedded into imagery (e.g., one or more still images, video, etc.) that is projected (e.g., onto a screen) or otherwise displayed (e.g., on a sign, by an electronic visual display such as a television, etc.) at an event, a venue, etc. In one embodiment, auxiliary data may even be embedded (e.g., in a manner as described in U.S. Patent App. Pub. No. 2013/0195273, which is hereby incorporated by reference) into illumination effects created by stage lighting instruments such as floodlights, spotlights, etc., DJ lighting, strobe lighting, or the like.

While the embodiments detailed above contemplated identifying information as being carried directly by a watermark signal, this need not be the case. For example, the watermark signal may carry a reference number that can be used to look up identifying information (e.g., stored in a database). The database may be stored locally (e.g., at the mobile device that captured the AV content), stored remotely (e.g., at a remote server that is accessible to the mobile device), or the like or any combination thereof.

While the embodiments detailed above contemplated watermarks as conveying information such as identifying information (e.g., watermark ID) and synchronization information (e.g., timestamps), it will be appreciated that digital watermarks may convey additional or alternative types of information (e.g., one or more text-based descriptors, ID numbers, etc.) indicating characteristics or descriptive features of the content output to audience members (e.g., via the output system 102), or otherwise indicating or including any metadata that is associated with the identifying information, synchronization information, etc.

For example, a few bits of the watermark payload data embedded within produced content may convey descriptive information indicating that the produced content is live music, pre-recorded music, content associated with a live event, content streamed by a media-streaming service (e.g., NETFLIX, PANDORA, HULU, etc.), content associated with a television program, or the like or any combination thereof. In another example, the watermark payload data embedded within produced content may convey descriptive information indicating one or more items of the aforementioned content policy information. Once such content is captured and uploaded, the descriptive information can be extracted and thereafter used for any number of purposes. For example, the extracted descriptive information can be used to control an aspect of the uploading process (e.g., so as to identify the system(s) and/or site(s) to which the captured content should be uploaded etc.), to control an aspect of a content hosting service's ingest process of the uploaded content (e.g., so as to make the uploaded content available for sharing more quickly, so as to control the format into which the uploaded content is transcoded, etc.), to control which social networking services can access uploaded content, to control an aspect of a social networking service's alert process (e.g., so as to permit alerts to be sent to others at live events or to be sent for content identified from content captured at live events, preventing alerts to be sent to others for content identified from TV or played from streamed music services, etc.), to permit uploaded content to be viewed, shared, etc. (e.g., from a content hosting system and/or social networking system) by users in one or more particular territories (e.g., as evidenced by a user's account profile), to permit the uploaded content to be viewed (e.g., from a content hosting system and/or social networking system) by users of a certain age (e.g., as evidenced by a user's account profile). This of course could be done by lookup in the ID database 1310 if such metadata has already been provided (e.g., via the WM embedder 1302, user of the WM embedder 1302, or other entity such as an event organizer).

In one embodiment, a forensic watermark search process can be performed (e.g., as part of the correlation and/or data aggregation processes described above). According to the forensic watermark search process, whenever information is initially extracted from captured or uploaded content (whether by extraction of digital watermark data, content fingerprint extraction and matching, etc.), a database (e.g., the ID database 1310, a database associated with, or otherwise accessible by the uploading system 1404, etc.) can be queried (e.g., by the watermark server 1308, the uploading system 1404, etc.) to find information (e.g., identifying information, etc.) known to be either inserted (i.e., in the case of watermarks) or registered (i.e., in the case of content fingerprints) in conjunction with the extracted information. In another embodiment, the database can be queried to find information (e.g., identifying information, etc.) known to be associated with content that was captured at a location that is spatially near (e.g., within 0.1 to 5 miles, etc.) to where the content conveying the extracted information was captured. In yet another embodiment, the database can be queried to find information (e.g., identifying information, etc.) known to be associated with content that was captured at a time that is temporally near (e.g., within 5 minutes, either before or after) when the content conveying the extracted information was captured. In still another embodiment, the database can be queried to find information (e.g., identifying information, etc.) known to be associated with content that was captured at the same event or venue where the content conveying the extracted information was captured. In yet another embodiment, the database can be queried to find information (e.g., identifying information, etc.) known to be associated (either directly or indirectly) with metadata, social media aggregations or postings, etc. Any identifying information found as a result of the forensic search process can then be analyzed to determine whether the captured or uploaded content might be embedded with watermark data (e.g., other than what was initially extracted) that might be possibly only briefly or poorly recorded due to audience noise or location of the mobile device, etc. Likewise, the presence of identification information (e.g., associated with one type of watermark, such as an audio watermark) can lead to clues indicating that the captured or uploaded content contains one or more other types of watermarks (e.g., image- or video-based watermarks, etc.).

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the signal processing operations for watermarking, fingerprinting, calculating mobile device position/orientation, and processing AV posts may be implemented as instructions stored in tangible computer-readable media (e.g., including semiconductor memory such as volatile memory SRAM, DRAM, etc., non-volatile memory such as PROM, EPROM, EEPROM, NVRAM (also known as "flash memory"), etc., magnetic memory such as a floppy disk, hard-disk drive, magnetic tape, etc., optical memory such as CD-ROM, CD-R, CD-RW, DVD, Holographic Versatile Disk (HVD), Layer-Selection-Type Recordable Optical Disk (LS-R), etc., or the like or any combination thereof) and executed in a programmable computer (including both software and firmware instructions), implemented as digital logic circuitry in a special purpose digital circuit, or combination of instructions executed in one or more processors and digital logic circuit modules. The methods and processes described above may be implemented in programs executed from a system's memory (a computer readable medium, such as an electronic, optical or magnetic storage device). The methods, instructions and circuitry operate on electronic signals, or signals in other electromagnetic forms. These signals further represent physical signals like image signals captured in image sensors, audio captured in audio sensors, as well as other physical signal types captured in sensors for that type. These electromagnetic signal representations are transformed to different states as detailed above to detect signal attributes, perform pattern recognition and matching, encode and decode digital data signals, calculate relative attributes of source signals from different sources, etc.

The above methods, instructions, and hardware operate digital signal components. As signals can be represented as a sum of signal components formed by projecting the signal onto basis functions, the above methods generally apply to a variety of signal types. The Fourier transform, for example, represents a signal as a sum of the signal's projections onto a set of basis functions.

In view of the many embodiments to which principles of this technology can be applied, it should be recognized that the detailed embodiments are illustrative only and should not be taken as limiting the scope of my inventive work. Rather, I claim all such embodiments as fall within the scope and spirit of the following claims, and equivalents thereto. (These claims encompass only a subset of what I regard as inventive in this disclosure. No surrender of unclaimed subject matter is intended, as I reserve the right to submit additional claims in the future.)

The particular combinations of elements and features in the above-detailed embodiments are exemplary only; the interchanging and substitution of these teachings with other teachings in this and the incorporated-by-reference patents/applications are also contemplated.

What is claimed is:

1. A method comprising:
in a network system, receiving items of content captured by electronic devices associated with users, the received items being uploaded to the network system;
with one or more processors, executing instructions to perform the acts of:
extracting digital watermarks in image signals from the received items of captured content;
with watermark IDs decoded from the digital watermarks, querying a database to obtain a first instance of metadata associated with a first watermark ID extracted from a corresponding first instance of received item and querying the database to obtain other instances of metadata associated with other watermark IDs extracted from corresponding other instances of the received items;
correlating the first instance of metadata associated with the first instance of received item with the other instances of metadata corresponding to the other instances of the received items, the correlating identifying related received items that have correlated metadata; and
aggregating the related received items for presentation to a user of the network system.

2. The method of claim 1, wherein the received items of captured content comprise image content captured by cameras of the users at an event, wherein each of the electronic devices captures instances of image content, the instances each being embedded with the digital watermark, which is associated with the event.

3. The method of claim 1, wherein the received items of captured content comprise images of watermarked objects.

4. The method of claim 1, further comprising:
deriving content fingerprints from the received items;
in the network system, identifying the received items by matching the content fingerprints with corresponding fingerprints associated with identifying metadata;
obtaining second metadata of the received items associated with the identifying metadata; and
correlating the second metadata of the received items.

5. The method of claim 1, further comprising correlating the received items with each other based on the watermark IDs.

6. The method of claim 1 wherein the first instance and other instances of metadata are comprised of metadata obtained by plural stages of aggregating metadata, including a first stage of obtaining first metadata associated with a watermark ID extracted from one of the received items and a second stage of obtaining metadata associated with the first metadata, and wherein the correlating determines the correlated metadata by correlating metadata of plural different received items that has been aggregated for the received items in the plural stages.

7. The method of claim 6 wherein the second stage of obtaining metadata comprises obtaining metadata indexed in plural databases by the first metadata.

8. The method of claim 1 comprising:
receiving upload metadata provided by users to the network system along with the received items when the received items are uploaded to the network system; and
aggregating the upload metadata with other metadata associated with a first received item by associating the upload metadata and the other metadata with a watermark ID extracted from the first received item.

9. The method of claim 1 further comprising:
updating metadata associated with the received items in the network system by receiving metadata update information at the network system and in response, querying an ID database to obtain updated metadata for the received items that is associated with the received items based on the watermark IDs extracted from the received items.

10. The method of claim 9 wherein the updating is performed after the received items are uploaded to the network system to update metadata of the received items with new metadata created after the received items are uploaded to the network system.

11. The method of claim 1 wherein the correlating is updated by searching metadata of a second set of received items uploaded to the network system after a first set of received items has been uploaded to the network system; and updating the first set of received items by linking received items from the second set with received items that have correlated metadata.

12. A system comprising:
means for uploading, the means for uploading configured to receive items of content captured by electronic devices associated with users;
means for watermark recovery communicatively coupled to the means for uploading, the means for watermark recovery configured to extract digital watermarks in image signals from the received items of captured content; and
a server communicatively coupled with the means for watermark recovery to receive watermark IDs decoded from the digital watermarks, and configured to query a database to obtain a first instance of metadata associated with a first watermark ID extracted from a corresponding first instance of received item and to query the database to obtain other instances of metadata associated with other watermark IDs extracted from corresponding other instances of the received items and provide the first and other instances of metadata to the means for uploading;
wherein the means for uploading is configured to correlate the first instance of metadata associated with the first instance of received item with the other instances of metadata corresponding to the other instances of the received items, the means for uploading executing the correlating to identify related received items that have correlated metadata; and the means for uploading configured to aggregate the related received items for presentation to a user.

13. The system of claim 12 wherein the first instance and other instances of metadata are comprised of metadata obtained by plural stages of aggregating metadata;
wherein the means for uploading is configured to obtain, in a first stage, first metadata associated with a watermark ID extracted from one of the received items, and is configured to obtain, in a second stage, metadata associated with the first metadata; and
wherein the means for uploading is configured to obtain the correlated metadata by correlating metadata of plural different received items that has been aggregated for the received items in the first and second stages.

14. The system of claim 12 wherein the means for uploading is configured to obtain, in the second stage, metadata indexed in plural databases by the first metadata.

15. The system of claim 12 wherein the means for uploading is configured to receive upload metadata provided by users along with the received items when the received items are uploaded to the means for uploading, and is configured to aggregate the upload metadata with other metadata associated with a first received item by associating the upload metadata and the other metadata with a watermark ID extracted from the first received item.

16. The system of claim 12 wherein the means for uploading is configured to update metadata associated with the received items by receiving metadata update information, and in response, querying an ID database to obtain updated metadata for the received items that is associated with the received items based on the watermark IDs extracted from the received items.

17. The system of claim 16 wherein the means for uploading is configured to update metadata of the received items after the received items are uploaded to the means for uploading to update metadata of the received items with new metadata created after the received items are uploaded to the means for uploading.

18. The system of claim 12 wherein the means for uploading is configured to search metadata of a second set of received items uploaded to the system after a first set of received items has been uploaded to the system, and is configured to update the first set of received items by linking received items from the second set with received items that have correlated metadata.

19. The system of claim 12 wherein the watermark IDs are embedded in captured images, which are captured from watermarked objects.

20. A non-transitory computer readable medium, on which is stored instructions, which when executed by a processor, perform a method comprising:
  in a network system, receiving items of content captured by electronic devices associated with users, the received items being uploaded to the network system;
  with one or more processors, executing instructions to perform the acts of:
  extracting digital watermarks in image signals from the received items of captured content;
  with watermark IDs decoded from the digital watermarks, querying a database to obtain a first instance of metadata associated with a first watermark ID extracted from a corresponding first instance of received item and querying the database to obtain other instances of metadata associated with other watermark IDs extracted from corresponding other instances of the received items;
  correlating the first instance of metadata associated with the first instance of received item with the other instances of metadata corresponding to the other instances of the received items, the correlating identifying related received items that have correlated metadata; and
  aggregating the related received items for presentation to a user of the network system.

* * * * *